(12) United States Patent
Agrawal et al.

(10) Patent No.: US 9,930,218 B2
(45) Date of Patent: Mar. 27, 2018

(54) CONTENT AWARE IMPROVEMENT OF CAPTURED DOCUMENT IMAGES

(71) Applicant: Adobe Systems Incorporated, San Jose, CA (US)

(72) Inventors: Ram Bhushan Agrawal, Uttar Pradesh (IN); Anuj Shara, Delhi (IN); Abhijeet Gaiha, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 100 days.

(21) Appl. No.: 15/090,397

(22) Filed: Apr. 4, 2016

(65) Prior Publication Data
US 2017/0289405 A1    Oct. 5, 2017

(51) Int. Cl.
*G06F 15/00*     (2006.01)
*H04N 1/58*      (2006.01)
*H04N 1/60*      (2006.01)

(52) U.S. Cl.
CPC .............. *H04N 1/58* (2013.01); *H04N 1/6005* (2013.01); *H04N 1/6008* (2013.01); *H04N 1/6072* (2013.01); *H04N 2201/0081* (2013.01)

(58) Field of Classification Search
CPC ...... H04N 1/58; H04N 1/6005; H04N 1/6008; H04N 1/6072
USPC ........................................................ 358/520
See application file for complete search history.

(56) References Cited

U.S. PATENT DOCUMENTS

| | | | | |
|---|---|---|---|---|
| 8,457,426 B1* | 6/2013 | Agrawal | ................... | H04N 1/64 382/237 |
| 2003/0053681 A1* | 3/2003 | Jia | ........................... | H04N 1/38 382/154 |
| 2010/0322515 A1* | 12/2010 | Cheng | ................ | G06K 9/00375 382/173 |
| 2012/0020557 A1* | 1/2012 | Gaubatz | .................. | G06T 5/005 382/167 |
| 2013/0114894 A1* | 5/2013 | Yadav | .................... | G06T 5/008 382/167 |

(Continued)

OTHER PUBLICATIONS

"Border Noise Removal of Camera-Captured Document Images Using Page Frame Detection"; Bukhari et al.; Technical University of Kaiserslautern, Germany, German Research Center for Artificial Intelligence (DFKI), Kaiserslautern, Germany; Sep. 2011.

(Continued)

*Primary Examiner* — Mark Milia
(74) *Attorney, Agent, or Firm* — Keller Jolley Preeece

(57) ABSTRACT

Systems and methods are disclosed for content aware digital image enhancement. In particular, in one or more embodiments, the disclosed systems and methods analyze content of a digital image portraying a document with graphics and/or text and generate a cleaning confidence map. Specifically, in one or more embodiments, the disclosed systems and methods generate a cleaning confidence map indicating a likelihood that each pixel in the digital image portrays text or a graphic. Moreover, in one or more embodiments, the disclosed systems and methods utilize the cleaning confidence map as a reflection of how aggressively to modify digital images. In particular, in one or more embodiments, the disclosed systems and methods utilize the cleaning confidence map to remove shadows, identify and clean background pixels, and correct contrast in relation to the digital image.

20 Claims, 21 Drawing Sheets

(56) References Cited

U.S. PATENT DOCUMENTS

| | | | | |
|---|---|---|---|---|
| 2013/0243314 | A1* | 9/2013 | Civit | G06T 7/0079 |
| | | | | 382/164 |
| 2014/0240477 | A1* | 8/2014 | Feng | H04N 5/217 |
| | | | | 348/77 |
| 2014/0333626 | A1* | 11/2014 | Gurman | G06K 9/00201 |
| | | | | 345/426 |
| 2015/0235080 | A1* | 8/2015 | Pan | G06K 9/00442 |
| | | | | 382/112 |

OTHER PUBLICATIONS

"Cast Shadow Removal Combining Local and Global Features"; Liu et al.; National Laboratory of Pattern Recognition, Institute of Automation, Chinese Academy of Sciences, Beijing, P.R. China; Jun. 2007.

"Clutter Noise Removal in Binary Document Images"; Agrawal et al.; Institute of Advanced Computer Studies University of Maryland College Park, MD, USA; Dec. 2013.

"Improving the Quality of Degraded Document Images"; Kavallieratou et al.; Dept. of Information and Communication Systems Engineering University of the Aegean, Karlovassi, Greece; Apr. 2006.

"On the Removal of Shadows From Images"; Finlayson et al.; Simon Fraser University, Canada; Jan. 2006.

"Removing Shadows from Images" Finlayson et al.; School of Information Systems, the University of East Anglia, England, School of Computing Science, Simon Fraser University, Canada, May 2002.

"Shadow Detection and Removal from a Single Image"; Blajovici et al.; 19th Summer School on Image Processing, Hungary; Jul. 2011.

"Shadow Detection for Moving Humans Using Gradient-Based Background Subtraction"; Shoaib et al.; Institut für Informationsverarbeitung, Leibniz Universität Hannover; Apr. 2009.

"Shadow Removal from Single RGB-D Images"; Xiao et al.; The Hong Kong University of Science and Technology; Jun. 2014.

"Single-Image Shadow Detection and Removal Using Paired Regions"; Guo et al.; University of Illinois at Urbana Champaign; Jun. 2011.

* cited by examiner

Glyph Mask 210

| 0 | 0 | 0 | 0 | 0 | 0 | 0 |
|---|---|---|---|---|---|---|
| 0 | 0 | 1 | 1 | 1 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

Original Digital Image *102*

Glyph Mask *250*

Color and Illumination Confidence Map *260*

Cleaning Confidence Map *270*

Brightened Digital Image 330

Modified Local Luminance Map 340

Blurred Cleaning Confidence Map 350

Shadow Removal Image 360

Original Image 102

Intermediate Mask 440

Blur Mask 442

Foreground Mask 444

Shadow Removal Image *460*          Background Cleaned Digital Image *462*

Background Cleaned Digital Image 510

Final Digital Image After Contrast Correction 512

CONTENT AWARE IMPROVEMENT OF CAPTURED DOCUMENT IMAGES

BACKGROUND

Recent years have seen a rapid proliferation in the use of digital devices for capturing digital images. Indeed, in addition to utilizing digital devices to communicate, generate documents, and play music, individuals and businesses now routinely utilize smartphones, cell phones, digital cameras, or other mobile digital devices to capture digital images relating to employment, entertainment, and other aspects of daily life.

Recently, it has also become increasingly common for individuals to use smartphones (or other mobile devices) to capture digital images of paper documents. For example, individuals routinely capture digital images of notes, receipts, business cards, invoices, reports, medical cards, etc. Utilizing mobile devices, individuals and businesses can easily capture, store, and utilize documents in digital format.

Although it is increasingly common for individuals to convert physical documents to digital images utilizing mobile digital image capturing devices, resulting digital images often have a number of problems. Indeed, documents captured in digital images via mobile devices are often unclear and difficult to see and/or read. For example, capturing digital images of documents utilizing smartphones (or other mobile devices) typically results in digital images with inconsistent lighting due to non-uniform light sources and shadows (e.g., a shadow from a hand, arm, or head of a person capturing the digital image). Similarly, white documents captured in a digital image with a smartphone often have a grayish hue (i.e., the background does not appear white in the resulting digital image). Moreover, documents captured utilizing mobile devices often result in digital images containing blurred text due to incorrect focus and/or lens limitations.

Some conventional digital image processing systems seek to solve these problems with complex machine learning classifiers. Although such conventional digital image processing systems identify and correct dark regions, they are often computationally exhausting (i.e., they require significant computational power to train and utilize a classifier). Moreover, such systems often have difficulty working with images containing layered or diffused shadows, which are typical with digital images captured via a smartphone or digital camera. Similarly, such conventional systems often require a calibrated camera and/or light sensor data, which are not generally available when individuals and businesses capture digital images.

These and other problems exist with regard to current techniques for enhancing digital images.

BRIEF SUMMARY

Embodiments of the present disclosure provide benefits and/or solve one or more of the foregoing or other problems in the art with systems and methods that analyze the content of pixels in a digital image (i.e., a digital image portraying a physical document) and enhance pixels in the digital image based on pixel content. In particular, in one or more embodiments, the systems and methods determine a confidence that pixels in a digital image correspond to text areas, background areas, and/or colored areas in the digital image. Moreover, the systems and methods can uniquely modify the pixels based on the determined confidence to enhance the quality of the digital image. For instance, in one or more embodiments, the disclosed systems and methods adjust luminosity and/or color of pixels in a digital image to improve the appearance and text quality of the digital image based on whether pixels correspond to text, background, or graphics in a digital image.

More particularly, in one or more embodiments, the disclosed systems and methods generate a cleaning confidence map that reflects the likelihood that pixels in a digital image represent text or graphics. In one or more embodiments, the disclosed systems and methods generate a cleaning confidence map that estimates the likelihood that pixels in a digital image represent text or graphics based on whether the pixels are colored or dark (i.e., represent graphics or text) or whether the pixels are grayscale with high luminosity (i.e., do not represent non graphics or text).

Moreover, in one or more embodiments, the disclosed systems and methods utilize the cleaning confidence map as a measure of how aggressively to modify (e.g., clean) individual pixels. For example, in one or more embodiments, the disclosed systems and methods adjust pixels more aggressively that are grayscale with a high luminosity (i.e., pixels that do not represent graphics or text) while adjusting pixels less aggressively that are colored or dark (e.g., graphics or text). Specifically, the disclosed systems and methods remove shadows, clean background pixels, and correct contrast based on the content of individual pixels as reflected in a cleaning confidence map. In this manner, the disclosed systems and methods apply a context aware approach (e.g., based on whether a pixel corresponds to text, graphics, or background) to more precisely and accurately enhance digital images.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1A:
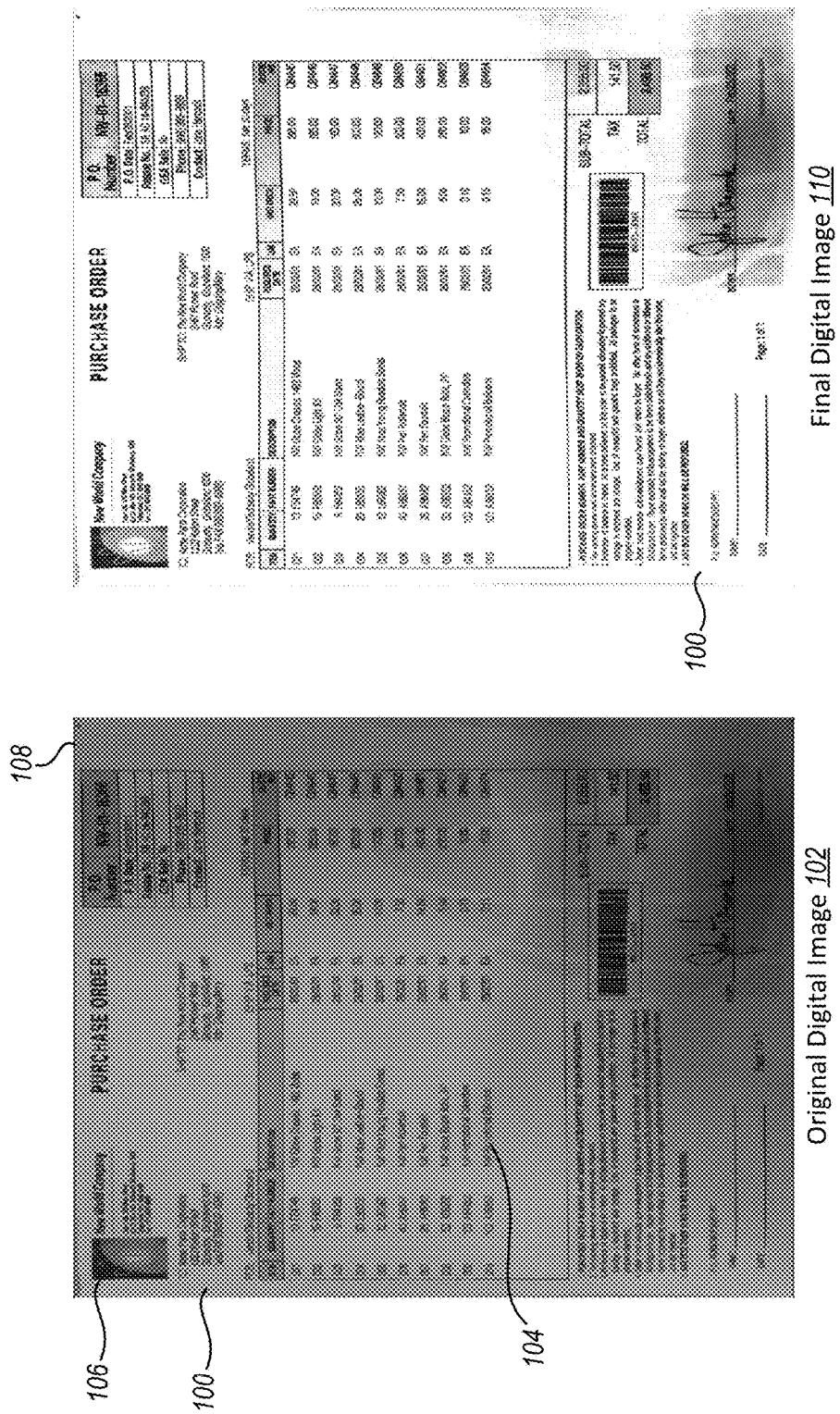
FIG. 1A illustrates a representation of an original digital image portraying a document and a final digital image portraying the document upon enhancement utilizing a cleaning confidence map in accordance with one or more embodiments.

One or more embodiments of the present disclosure include a digital image enhancement system and corresponding methods that improve the appearance and quality of digital images (i.e., digital images of physical documents) based on content aware pixel modifications. In particular, in one or more embodiments, the digital image enhancement system identifies pixels uniquely based on different content portrayed in the pixels (e.g., text, colored areas such as graphics, or background). Moreover, the digital image enhancement system modifies pixels in the digital image based on the content corresponding to the pixels.

For example, in one or more embodiments, the digital image enhancement system determines a confidence that pixels portray text/graphics or background in the digital image. In particular, in one or more embodiments, the digital image enhancement system generates a cleaning confidence map that reflects the confidence that a pixel corresponds to background of the digital image (i.e., an area of the digital image that can be aggressively cleaned, as opposed to text or graphics). The digital image enhancement system then modifies pixels of the digital image based on the cleaning confidence map and the determined confidence that pixels correspond to background of the digital image. Specifically, the digital image enhancement system utilizes the cleaning confidence map to modify pixels with a high cleaning confidence value more aggressively than pixels with a low cleaning confidence value.

As just mentioned, in one or more embodiments, the digital image enhancement system generates a cleaning confidence map that reflects a confidence or likelihood that a pixel corresponds to background (as opposed to text or graphics). In one or more embodiments, the digital image enhancement system generates a cleaning confidence map based on color and luminosity of pixels in a digital image. Specifically, in one or more embodiments, the digital image enhancement system leverages the fact that text and graphics generally correspond to pixels that are colored or dark while background pixels generally correspond to pixels that are grayscale and light. Accordingly, the digital image enhancement system generates a cleaning confidence map with confidence values that increase in relation to pixels that are grayscale and light (generally background pixels) and confidence values that decrease in relation to pixels that are colored or dark (generally text or graphics).

In addition to generating a cleaning confidence map based on color and luminosity of particular pixels, in one or more embodiments, the digital image enhancement system also generates a cleaning confidence map based on a determination that a particular digital pixel reflects a glyph (e.g., a text character) in the digital image. In particular, in one or more embodiments, the digital image enhancement system generates a glyph mask that indicates whether a pixel corresponds to a glyph (e.g., text character) in the digital image. Specifically, in one or more embodiments, the digital image enhancement system applies an Edge Based Adaptive Binarization (EBAB) algorithm or an optical character recognition algorithm to generate a glyph mask that identifies whether pixels corresponds to text characters in a digital image. The digital image enhancement system can then utilize the glyph mask to generate the cleaning confidence map such that the cleaning confidence map more accurately reflects pixels that correspond to text.

As mentioned above, upon generating a cleaning confidence map, the digital image enhancement system can utilize the cleaning confidence map to modify digital pixels based on their content. In particular, in one or more embodiments, the digital image enhancement system identifies pixels corresponding to shadows by analyzing local illumination of areas surrounding particular pixels. Moreover, the digital image enhancement system then applies the cleaning confidence map to identified pixels corresponding to shadows to remove the shadows based on the content of each pixel (e.g., remove the shadows from background pixels without fading or erasing text or graphics).

Similarly, the digital image enhancement system can apply a cleaning confidence map to segregate foreground pixels from background pixels and clean the background pixels. Indeed, as mentioned previously, in capturing digital images of documents via mobile devices, the background of the resulting digital image often appears to have an unnatural hue (e.g., a grayish color). In one or more embodiments, the digital enhancement system utilizes the cleaning confidence map to segregate the foreground pixels from the background pixels to remove such a hue from the background pixels. In particular, as discussed in greater detail below, the digital image enhancement system utilizes the cleaning confidence map and the glyph mask to decompose a digital image into foreground pixels and background pixels and then clean the background pixels.

Furthermore, in one or more embodiments, the digital image enhancement system can utilize the cleaning confidence map to apply content aware contrast enhancement. In particular, the digital image enhancement system can calculate a luminosity correction corresponding to each digital image (e.g., via luminosity histogram stretching). Moreover, the digital image enhancement system can modify the luminosity correction based on the cleaning confidence map. In this manner, the digital image enhancement system adjusts contrast more aggressively with regard to portions of a digital image less likely to represent text or graphics. The result is a corrected digital image with cleaner, brighter background pixels, clearer text, and more vibrant colors.

By utilizing a cleaning confidence map, the digital image enhancement system can improve the appearance and text quality of digital images reflecting physical documents captured through mobile devices. Indeed, by utilizing a cleaning confidence map, in one or more embodiments, the digital image enhancement system applies content aware modifications specific to the content of each pixel (e.g., pixels corresponding to text or graphics) resulting in more specific and appropriate modifications and a higher quality resulting digital image.

Notably, although the digital image enhancement system applies content aware adjustments to pixels of a digital image, the digital image enhancement system does not need to identify boundaries. For example, unlike conventional systems, the digital image enhancement system does not need to identify boundaries of shadow regions. Indeed, by utilizing a cleaning confidence map (and/or modified local luminance map), the digital image enhancement system works with regard to layered or diffuse shadows, which are typical in capturing digital images of physical documents utilizing mobile devices.

In addition, by utilizing a cleaning confidence map generated based on luminosity and color of pixels in a digital image, the digital image enhancement system operates without the need for a calibrated camera or utilizing light sensor data. This is significant, given that mobile devices are unlikely to have correct calibration and given that light sensor data is often not available.

Furthermore, by utilizing a cleaning confidence map, the digital image enhancement system can improve the appearance and text quality of digital images with less computational resources (e.g., processing power or RAM) than other conventional systems. For example, the digital image enhancement system does not require the resources required to train or utilize a machine learning algorithm to classify regions or boundaries within a digital image. Moreover, as outlined in greater detail below, the digital image enhancement system includes a variety of approaches to reduce the computational time and resources required to enhance digital images.

Additional detail will now be provided regarding the digital image enhancement system in relation to illustrative figures portraying exemplary embodiments. In particular, in relation to FIGS. 1A-1B detail is provided regarding overarching steps in a method of enhancing digital images utilizing a cleaning confidence map in accordance with one or more embodiments. Thereafter, FIGS. 2A-5B provide additional detail regarding utilizing a cleaning confidence map to remove shadows from a digital image, segregate and clean background pixels of a digital image, and adjust contrast of a digital image in accordance with one or more embodiments.

As mentioned above, in one or more embodiments, the digital image enhancement system can improve the appearance of a digital image of a physical document. FIG. 1A illustrates an original digital image 102 and a final digital image 110 generated in accordance with one or more embodiments of the digital image enhancement system. In particular, the original digital image 102 is a digital image reflecting a document 100 (i.e., an invoice) captured by a digital camera associated with a smartphone. The final digital image 110 reflects the original digital image 102 after shadow removal, background cleaning, and contrast correction utilizing a cleaning confidence map.

As used herein, the term "digital image" refers to any digital symbol, picture, icon, or illustration. For example, the term "digital image" includes digital files with the following, or other, file extensions: JPG, TIFF, BMP, PNG, RAW, or PDF. For instance, the term "digital image" includes a digital image representing a physical document captured by a digital image capturing device (e.g., mobile device, smartphone, and/or digital camera). Thus, in relation to FIG. 1A, the original digital image 102 comprises a digital image of the document 100 captured by a smartphone.

As shown in FIG. 1A, the original digital image 102 comprises a variety of glyphs and graphics. As used herein, the term "glyphs" refers to a character in a digital image. In particular, the term "glyph" includes text characters, such as letters or numbers, in a digital image. Similarly, as used herein, the term "graphic" refers to a graphical item displayed in a digital image. In particular, the term "graphic" includes a figure, chart, line, box, or drawing included in a digital image. Thus, in relation to FIG. 1A, the original digital image 102 includes glyphs 104 comprising text characters (i.e., letters and numbers describing a purchased product). Moreover, the original digital image comprises a graphic 106 (i.e., a company logo).

As shown in FIG. 1A, the original digital image 102 is relatively dark and difficult to read. For example, the background pixels of the original digital image 102 have a grayish hue. In addition, the original digital image 102 has a variety of shadows. As used herein, the term "background" or "background pixels" refers to pixels in a digital image that portray an area behind main objects in the digital image. In particular, the term "background" includes pixels in a digital image that do not portray glyphs or graphics. In addition, as outlined in greater detail below, the term "background" also includes pixels not included in a foreground mask. Thus, in relation to FIG. 1A, the term "background" includes pixels reflecting white space (i.e., white paper) of the document 100.

As used herein, the term "shadow" refers to a localized region of lower luminosity in a digital image. In particular, the term "shadow" refers to a localized region of low luminosity in a digital image resulting from variations in lighting in capturing the digital image. For example, the term "shadow" includes a dark area of a digital image produced by an object coming between a light source and a surface represented in the digital image. In relation to FIG. 1A, the original digital image 102 includes a number of shadows, including a shadow 108 in the upper right hand corner of the original digital image 102.

Figure 1B:
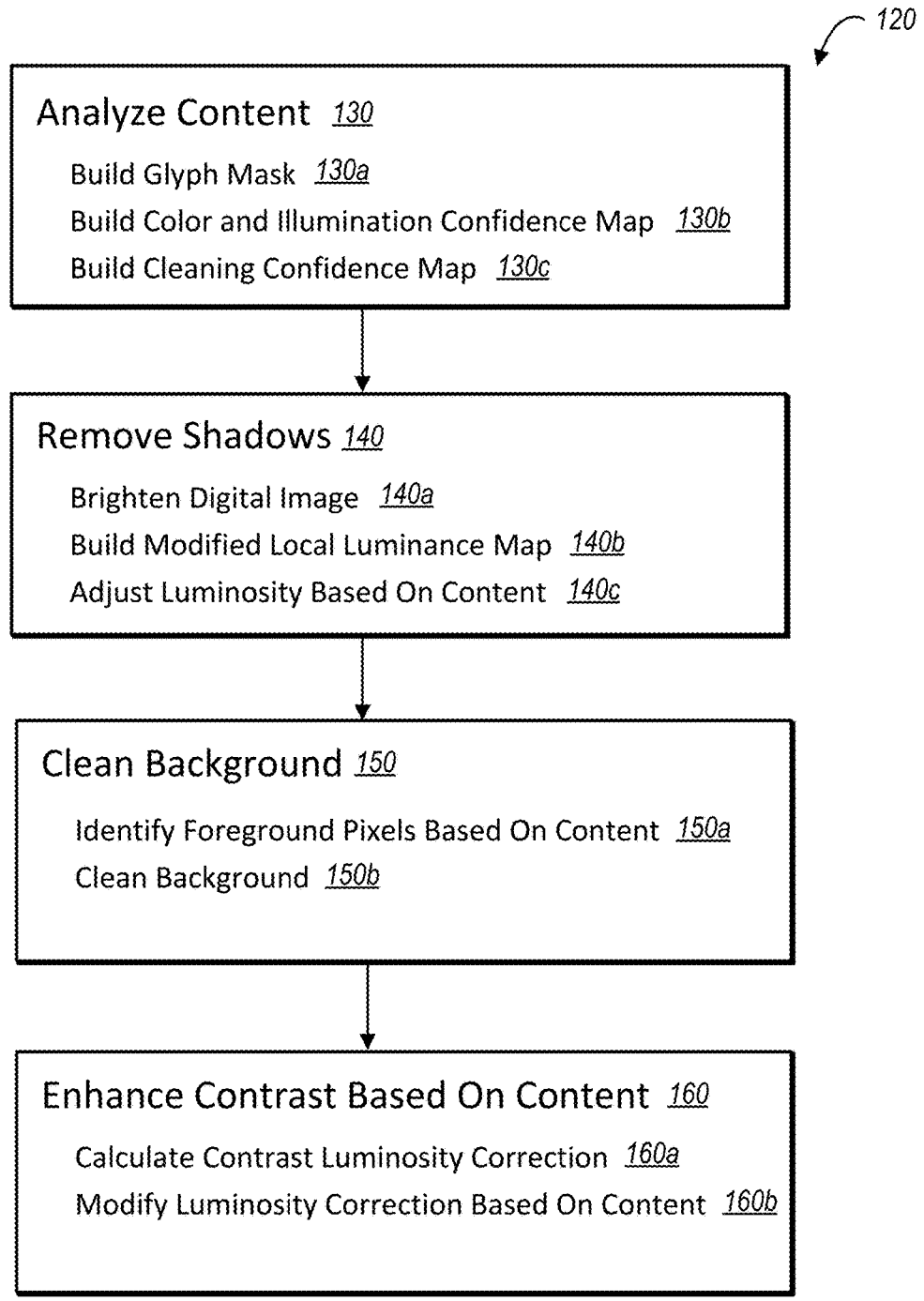
FIG. 1B illustrates a flowchart of a series of acts in a method of enhancing digital images utilizing a cleaning confidence map in accordance with one or more embodiments.

As mentioned, the background of the original digital image 102 is dark and discolored and the original digital image 102 has a variety of shadows, making the original digital image 102 (e.g., the text and graphics) difficult to see. In one or more embodiments, the digital image enhancement system transforms the original digital image 102 into the final digital image 110 utilizing a cleaning confidence map. As illustrated in FIG. 1B, in creating the final digital image 110, the digital image enhancement system removes the shadow 108. Similarly, the digital image enhancement system has brightened the background such that the background pixels no longer have a grayish hue. Moreover, the digital image enhancement system has increased the contrast, such that the final digital image 110 is not dark and difficult to read.

Although the original digital image 102 and the final digital image 110 are illustrated in relation to FIG. 1A without color, it will be appreciated that the original digital image 102 and the final digital image 110 can include color pixels. Thus, for example, the graphic 106 comprises color pixels. As mentioned previously, the digital image enhancement system can modify digital images with color pixels.

As mentioned, in one or more embodiments, the digital image enhancement system generates and utilizes a cleaning confidence map to enhance a digital image. FIG. 1B illustrates steps in a method 120 of enhancing a digital image utilizing a cleaning confidence map in accordance with one or more embodiments. In particular, FIG. 1B illustrates steps utilized to transform the original digital image 102 to the final digital image 110.

The method 120 is intended to be illustrative of one or more methods in accordance with the present disclosure, and is not intended to limit potential embodiments. The method described in relation to FIG. 1B may be performed with less or more steps/acts or the steps/acts may be performed in differing orders. Additionally, the steps/acts described herein may be repeated or performed in parallel with one another or in parallel with different instances of the same or similar steps/acts. Alternative embodiments can include additional, fewer, or different steps than those articulated in FIG. 1B.

As illustrated in FIG. 1B, the method 120 includes the step 130 of analyzing content. For example, the step 130 can include analyzing content of a digital image to identify glyphs, graphics, and/or background pixels. Moreover, the step 130 can include analyzing content of a digital image based on luminosity and color of pixels to identify a likelihood that pixels portray glyphs, graphics, or background in a digital image.

As used herein, the term "luminosity" refers to a measure of lightness. In particular, the term "luminosity" includes a measure of brightness or illumination of pixels in a digital image. It will be appreciated that the digital image enhancement system can utilize a variety of color spaces and luminosities. Accordingly, in some example embodiments, the term "luminosity" refers to the dimension "L" in an Lab color space. Similarly, in other embodiments, the term "luminosity" refers to the dimension "Y" in a $YC_bC_r$ color space.

In addition as used herein, the term "color" refers to a measure of red, green, yellow and/or blue. In particular, the term "color" refers to a measure of red, green, yellow, and/or blue in a pixel of a digital image. In some example embodiments, the term "color" refers to the dimensions "a" and/or "b" in an Lab color space. Similarly, the term "color" includes the dimensions "$C_b$" and/or "$C_r$" in a $YC_bC_r$. Moreover, the term "color" can include R, G, and/or B values in an RGB color space or C, M, Y, and/or K values in a CMYK color space.

As shown, the step 130 includes the step 130a of building a glyph mask. As used herein, the term "glyph mask" refers to digital data (e.g., a database, array, bitmap, image, monochrome image, or spreadsheet) that indicates whether pixels in a digital image portray a glyph. In particular, the term "glyph mask" includes an array where each entry in the array corresponds to a pixel in a digital image, and where each entry indicates whether a corresponding pixel portrays a glyph in the digital image. Additional detail regarding building a glyph mask is provided with regard to FIG. 2A.

As shown in FIG. 1B, the step 130 can also involve the step 130b of building a color and illumination confidence map. As used herein, the term "color and illumination confidence map" refers to digital data (e.g., a database, array, grayscale bitmap, image, or spreadsheet) that indicates the amount of luminosity and color corresponding to a pixel. In particular, the term "color and illumination confidence map" includes a grayscale bitmap where each entry in the bitmap indicates the extent that a corresponding pixel is both light (i.e., high luminosity) and not colored (e.g., gray or low color value). Similarly, the term "color and illumination confidence map" includes a grayscale bitmap that indicates the extent that pixels are colored (e.g., high color value) or dark (e.g., low luminosity).

Accordingly, the step 130b can include building a color and illumination confidence map that indicates the extent of color and luminosity corresponding to a pixel. More specifically, the step 130b can include building a color and illumination map that indicates the extent, probability, or likelihood that a pixel is both not colored and light (e.g., a background pixel). Similarly, the step 130b can include building a color and illumination map that indicates the extent, probability, or likelihood that a pixel is colored (e.g., a graphic) or dark (e.g., a glyph). Additional detail regarding color and illumination confidence maps is provided with regard to FIG. 2B.

As illustrated in FIG. 1B, the method 130 also includes the step 130c of building a cleaning confidence map. As used herein, the term "cleaning confidence map" refers to digital data (e.g., a database, array, grayscale bitmap, image, or spreadsheet) reflecting how aggressively (or to what extent) to modify pixels in a digital image. In particular, the "cleaning confidence map" can be a grayscale bitmap reflecting (via cleaning confidence values) how aggressively to modify a pixel in a digital image based on the luminosity of the pixel, the color of the pixel, and whether the pixel portrays a glyph. For instance, the "cleaning confidence map" can be a grayscale bitmap indicating (via the values of each pixel) a confidence, likelihood, or probability that a pixel in a digital image corresponds to a glyph, a graphic, or a background pixel. Thus, the "cleaning confidence map" also can include digital data indicating confidence that a particular pixel should be modified (or an extent that the particular pixel should be modified).

For example, in one or more embodiments, the digital image enhancement system modifies background pixels more aggressively than pixels reflecting glyphs or graphics. Accordingly, in one or more embodiments, the digital image enhancement system utilizes the glyph mask and the color and illumination confidence maps to generate the cleaning confidence maps. In this manner, the digital image enhancement system can generate a cleaning confidence map that estimates content of pixels and determines how aggressively the pixel should be modified. Additional detail regarding generating a cleaning confidence map is provided with regard to FIG. 2C.

As mentioned previously, upon analyzing content of a digital image and generating a cleaning confidence map, in one or more embodiments, the digital image enhancement system utilizes the cleaning confidence map to clean a digital image. In particular, the digital image enhancement system applies the cleaning confidence map to modify pixels differently based on the content of the pixels. For example, as illustrated in FIG. 1B, the method 120 includes the step 140 of removing shadows. The step 140 can include, for example, removing shadows utilizing a cleaning confidence map.

Moreover, as shown, the step 140 includes the step 140a of brightening a digital image. In particular, the step 140a can include generating a luminosity histogram from an original digital image and stretching the luminosity histogram toward the higher end of a luminosity range. Brightening a digital image initially lightens shadows, which improves the effectiveness of future steps in the method 120. Moreover, brightening the digital image can reduce noise in the image as well. Additional detail regarding brightening a digital image is provided with regard to FIG. 3A.

As shown in FIG. 1B, the method 120 also includes the step 140b of building a modified local luminance map. As used herein, the term "modified local luminance map" (also referred to herein as an "upper surface"), refers to digital data (e.g., a database, array, bitmap, image, or spreadsheet) indicating luminosity of a set of pixels in a digital image. In particular, the term "modified local luminance map" includes an array where each entry corresponds to a pixel of a digital image and each entry is based on luminosity of a set of pixels surrounding the pixel. In particular, the term "modified local luminance map" includes a grayscale bitmap where pixels of the grayscale bitmap correspond to pixels of a digital image and where each pixel of the grayscale bitmap is based on a highest luminosity level of a set of pixels in the digital image within a window surrounding the corresponding pixel in the digital image. Additional detail regarding building a modified local luminance map is provided with regard to FIGS. 3A-3B.

In addition to building a modified local luminance map, as shown in FIG. 1B, the method 120 also includes the step 140c of adjusting luminosity based on content. In particular, in one or more embodiments, the step 140c involves adjusting luminosity of a digital image based on a modified local luminance map and a cleaning confidence map. The step 140c can also include adjusting luminosity to generate a shadow removal image. As used herein, the term "shadow removal image" refers to an image where one or more shadows have been removed. In particular, the term "shadow removal image" includes a digital image modified from an original image wherein luminosity of pixels have been adjusted to remove one or more shadows.

For example, in one or more embodiments, the digital image enhancement system utilizes a modified local luminance map to identify pixels corresponding to dark areas of a digital image (i.e., shadows), and utilizes the cleaning confidence map to determine how aggressively to modify the identified pixels. The digital image enhancement system can modify the pixels to generate a shadow removal image. Additional detail regarding adjusting luminosity based on content to generate a shadow removal image is provided below with regard to FIG. 3C.

As shown in FIG. 1B, the method 120 also includes the step 150 of cleaning a background. In particular, the step 150 includes identifying and cleaning a background of a digital image based on content of the background pixels utilizing a cleaning confidence map.

Indeed, as shown in FIG. 1B, the step 150 includes the step 150a of identifying foreground pixels based on content (e.g., utilizing a cleaning confidence map). For example, in one or more embodiments, the act 150a includes utilizing a cleaning confidence map to identify a foreground mask. As used herein, the term "foreground mask" refers to digital data (e.g., a database, array, bitmap, image, or spreadsheet) identifying foreground pixels. In particular, the term "foreground mask" includes digital data identifying the pixels portraying glyphs and graphics in the digital image. For example, in one or more embodiments, the digital image enhancement system generates a foreground mask comprising a monochrome image where each pixel in the monochrome image identifies whether a corresponding pixel in a digital image portrays a glyph or a graphic.

More specifically, in one or more embodiments, the digital image enhancement system utilizes an intermediate mask and/or a blur mask to generate a foreground mask. As used herein, the term "intermediate mask" refers to digital data (e.g., a database, array, bitmap, image, or spreadsheet) reflecting a combination of a cleaning confidence map and glyph mask. In particular, the term "intermediate mask" includes a monochrome image generated by applying an "or" operator to a cleaning confidence map and a glyph mask. Accordingly, in one or more embodiments, the "intermediate mask" identifies foreground pixels by broadening the cleaning confidence map and the glyph mask. Additional detail regarding generating an intermediate mask is provided with regard to FIG. 4A.

In addition, as used herein, the term "blur mask" refers to digital data (e.g., a database, array, bitmap, image, or spreadsheet) reflecting a digital image upon application of a blur filter. In particular, a "blur mask" includes a monochrome image generated by applying a blur filter to a shadow removal image to identify one or more foreground pixels. Accordingly, in one or more embodiments, the "blur mask" identifies foreground pixels by removing foreground content (e.g., text and/or graphics) from a shadow removal image utilizing a blur mask and then identifying the removed foreground pixels. More specifically, in one or more embodiments, the digital image enhancement system generates a blur mask by downsizing a shadow removal image, applying a blur filter to get rid of foreground content, upsizing the resulting image, identifying the difference between the shadow removal image and the resulting image, and converting the difference to a monochrome image. Additional detail regarding generating a blur mask is provided in relation to FIG. 4B.

As mentioned, in one or more embodiments, the digital image enhancement system generates a foreground mask based on a blur mask and an intermediate mask. In particular, the digital image enhancement system applies an "and" operator to a blur mask and an intermediate mask. Accordingly, in one or more embodiments, the digital image enhancement system identifies a foreground mask by identifying foreground pixels commonly identified both in an intermediate mask (generated by broadening the cleaning confidence image) and a blur mask (generated by applying a blur filter to a shadow removal image). Additional detail regarding generating a foreground mask utilizing an intermediate mask and blur mask is provided in relation to FIG. 4C.

Moreover, as shown in FIG. 1B, the method 120 also includes the act 150b of cleaning a background. In particular, the act 150b can include utilizing the foreground mask to identify background pixels and then cleaning the identified background pixels. In one or more embodiments, the act 150*b* includes cleaning the background pixels based on distance from a white point. For example, in one or more embodiments, the digital image enhancement system identifies a white point in a color space and a distance between the white point in the color space and one or more background pixels. The digital image enhancement system cleans the background pixels based on the distance between the white point in the color space and the location of the background pixels of the digital image within the color space.

In addition to cleaning background pixels, as shown in FIG. 1B, the method 120 also includes the step 160 of enhancing contrast based on content. As used herein, the term "contrast" refers to a difference in luminosity or color that makes representations in a digital image distinguishable. In particular, the term "contrast" refers to a difference in luminosity or color between pixels in a digital image.

In one or more embodiments, the step 160 includes calculating a luminosity correction for each pixel in a digital image (e.g., based on a maximum luminosity and minimum luminosity in a luminosity histogram) and then modifying the luminosity correction based on a cleaning confidence map. In this manner, the digital image enhancement system can adjust contrast specific to the content of each pixel in a digital image.

In particular, as shown in FIG. 1B, the step 160 includes the step 160*a* of calculating a contrast luminosity correction. The step 160*a* can include a variety of approaches or algorithms to calculate a contrast luminosity correction. For example, the step 160*a* can include building a luminance channel histogram and stretching the luminance channel histogram to generate a contrast luminosity correction for each pixel in a digital image. It will be appreciated, however, that the digital image enhancement system can utilize output of any contrast correction technique, including histogram stretching Moreover, as shown in FIG. 1B, the step 160 also includes the step 160*b* of modifying a luminosity correction based on content. In particular, the step 160*b* includes modifying the contrast luminosity correction of the step 160*a* (i.e., the output of a contrast correction algorithm) based on a cleaning confidence map. For example, the step 160*b* can include modifying a histogram stretching technique based on a cleaning confidence map.

For instance, the step 160*a* can include calculating a luminosity correction with regard to each pixel to stretch a luminosity histogram based on the maximum luminosity and minimum luminosity from the histogram. Moreover, the step 160*b* can include adjusting the luminosity correction with regard to each pixel based on a cleaning confidence map such that the luminosity correction modifies pixels with a high cleaning confidence value more aggressively than pixels with a low cleaning confidence value. In this manner, the digital image enhancement system can modify contrast specific to content. Additional detail regarding modifying contrast utilizing a cleaning confidence map is provided in relation to FIG. 5A.

In sum, the method 120 enhances a digital image based on pixel content. In particular, utilizing the method 120 the digital image enhancement system generates a cleaning confidence map indicating how aggressive to apply modifications based on luminosity and color of individual pixels and then utilizes the cleaning confidence map to target and adjust the digital image. Specifically, the digital image enhancement system can apply the cleaning confidence map to pixels based on regional luminosity to remove shadows, can apply the cleaning confidence map to identify and clean background pixels, and can apply the cleaning confidence map to adjust contrast of the entire digital image.

Figure 2A:
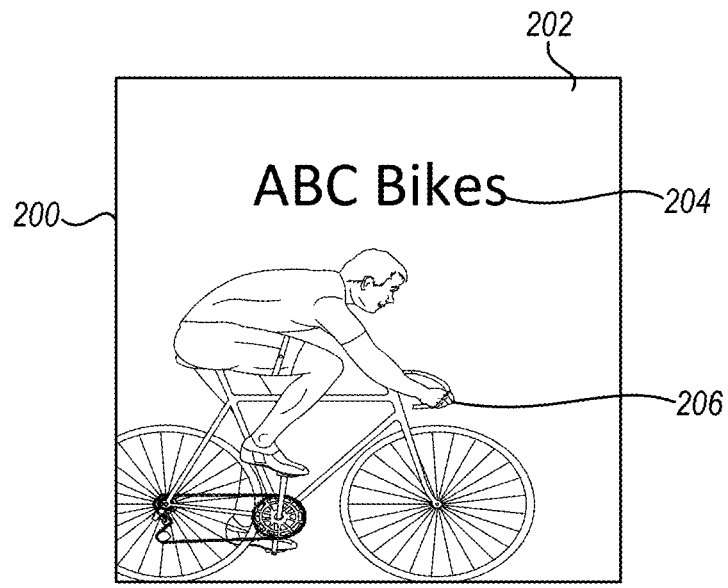
FIG. 2A illustrates a representation of generating a glyph mask in accordance with one or more embodiments.
Figure 2A:
Figure 2B:
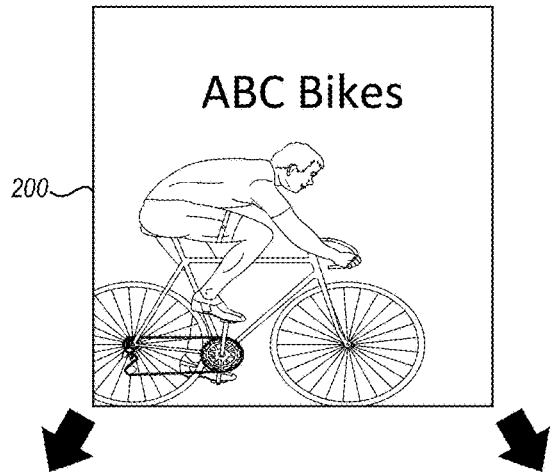
FIG. 2B illustrates a representation of generating a color and illumination confidence map in accordance with one or more embodiments.
Figure 2C:
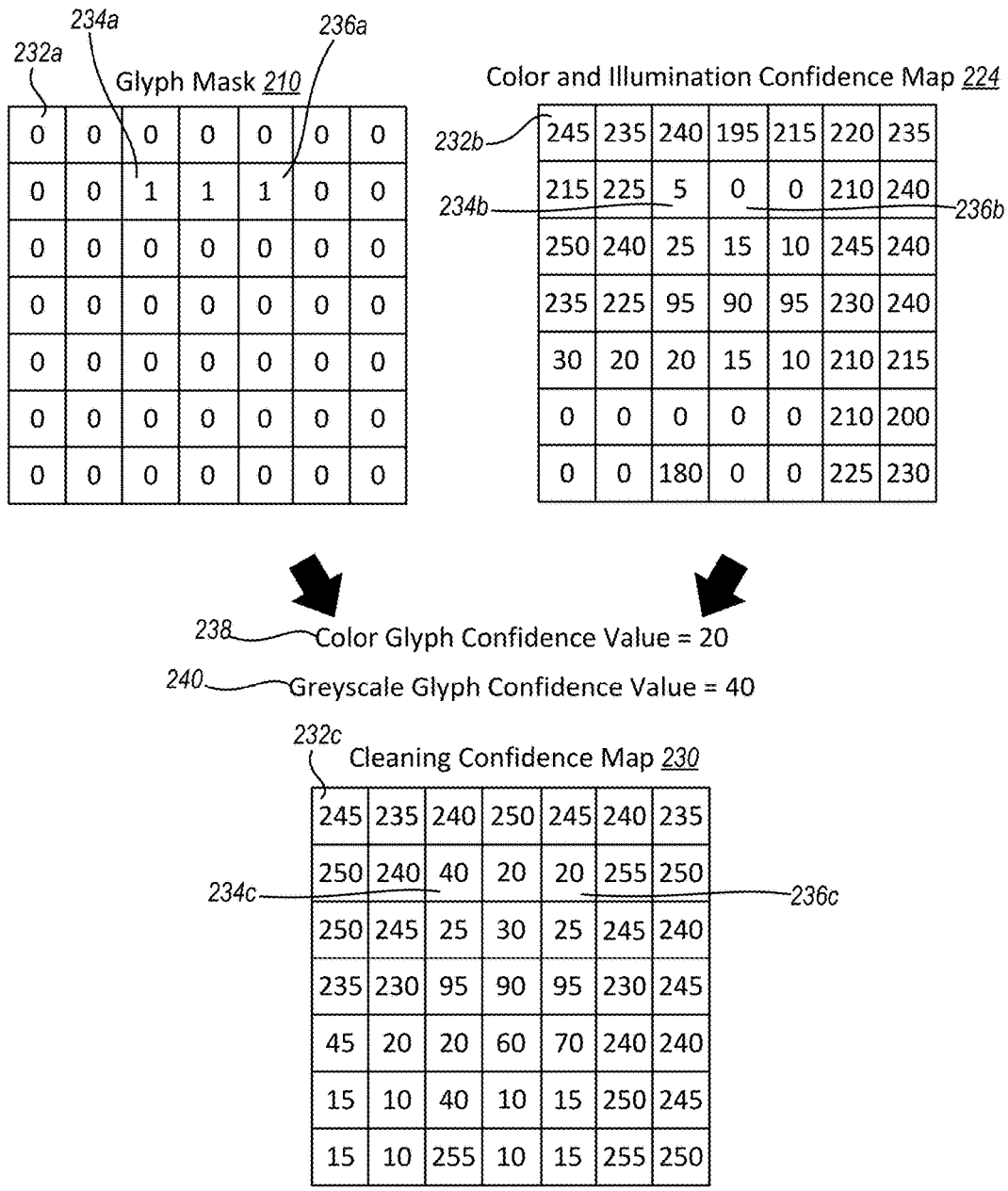
FIG. 2C illustrates a representation of generating a cleaning confidence map based on the glyph mask of FIG. 2A and the color and illumination confidence map of FIG. 2B in accordance with one or more embodiments.
Figure 2D:
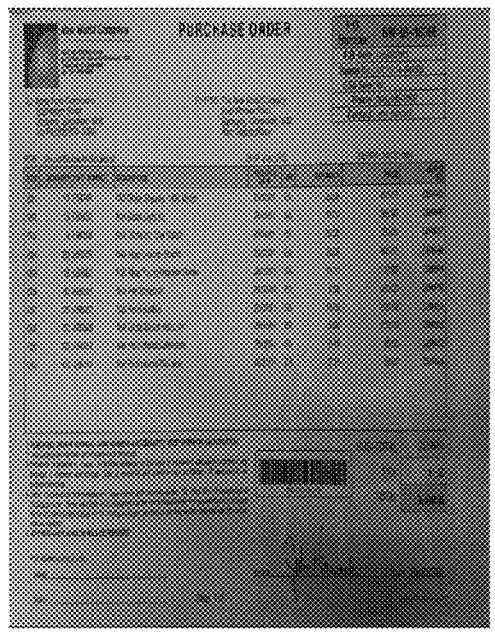
FIG. 2D illustrates representations of an original digital image, a glyph mask, a color and illumination confidence map, and a cleaning confidence map in accordance with one or more embodiments.
Figure 2D:
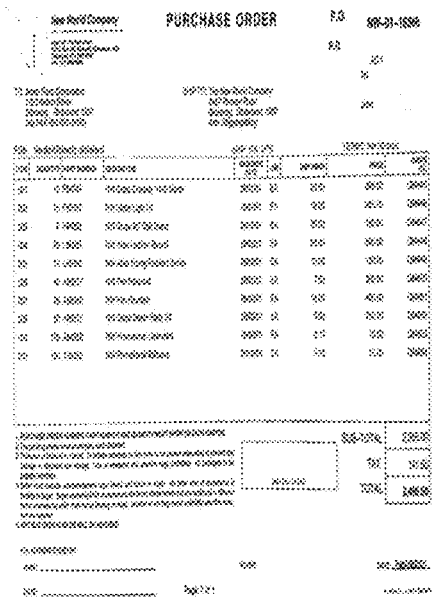
Figure 2D:
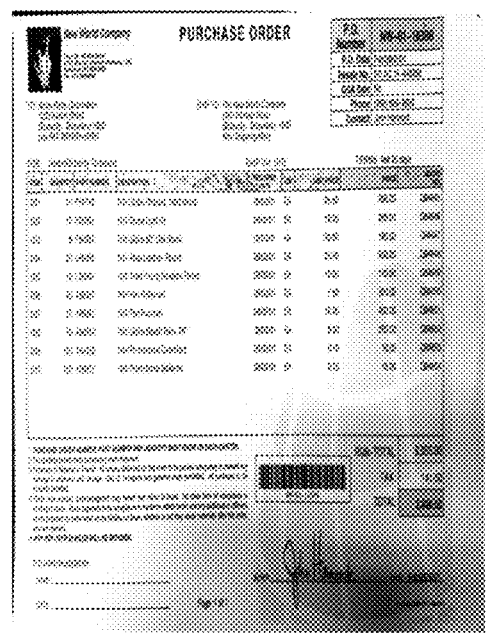
Figure 2D:
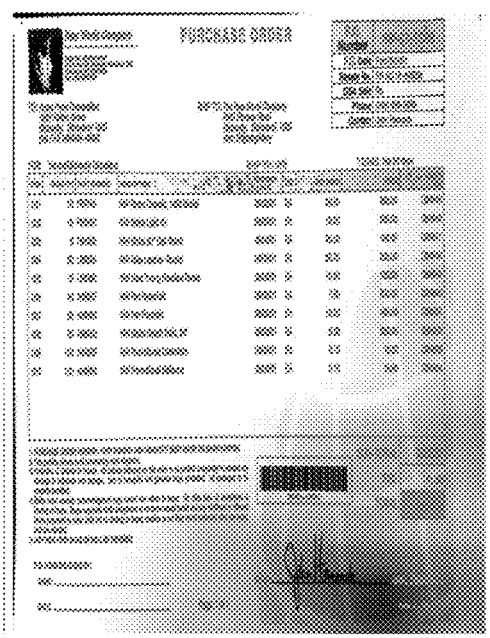

Turning now to FIGS. 2A-2D, additional detail will be provided regarding analyzing content of a digital image to generate a cleaning confidence map in accordance with one or more embodiments. In particular, FIG. 2A illustrates generating a glyph mask, FIG. 2B illustrates generating a color and illumination map, FIG. 2C illustrates utilizing a glyph mask and color and illumination map to generate a cleaning confidence map, and FIG. 2D illustrates image representations of a digital image, a glyph mask, a color and illumination map, and a cleaning confidence map in accordance with one or more embodiments.

For example, FIG. 2A illustrates a digital image 200 portraying a document 202 comprising text 204 and a graphic 206. Although shown in black and white, the digital image 200 comprises pixels in a variety of colors (i.e., colored shirt, shorts, bike, hair, skin, etc.).

As shown, the digital image enhancement system transforms the digital image 200 into a glyph mask 210. The digital image enhancement system can utilize a variety of approaches to generate the glyph mask 210. In relation to FIG. 2A, the digital image enhancement system utilizes a modified implementation of an edge based adaptive binarization technique. The edge based adaptive binarization technique is described in relation to U.S. Pat. No. 8,457,426 B1 to Ram Bhushan Agrawal and Amit Kumar Manocha, entitled Method And Apparatus For Compressing A Document Using Pixel Variation Information (hereinafter, "EBAB"), which is incorporated herein by reference.

As mentioned, in one or more embodiments, the digital image enhancement system utilizes a modified EBAB approach to generate the glyph mask 210. For example, in relation to the embodiment of FIG. 2A, the digital image enhancement system removes the Weiner filter. Moreover, the digital image enhancement system applies a pre-processing step not previously described in the EBAB approach. In particular, the digital image enhancement system applies a contrast correction to the digital image 200. Specifically, the digital image enhancement system applies a histogram stretching algorithm to the luminosity channel of the digital image 200 prior to applying the EBAB approach.

In addition to edge based adaptive binarization, the digital image enhancement system can utilize other techniques to identify pixels corresponding to a glyph and generate the glyph mask 210. For example, in one or more embodiments, the digital image enhancement system utilizes an optical character recognition ("OCR") algorithm. An OCR algorithm converts digital images into identifiable data (such as known glyphs or text characters). For example, in one or more embodiments, the digital identification system utilizes an OCR algorithm that employs pre-processing techniques (e.g., de-skewing, despeckling, binarization, line removal, layout analysis, line and word deletion, or character isolation techniques), matrix matching (e.g. comparing an image to a stored glyph on a pixel-by-pixel basis), and/or feature extraction techniques (e.g., decomposing images into features and digitally comparing the features to representations of a character), and post-processing techniques (e.g., constraining the resulting characters to a base digital font) to identify glyphs in a digital image.

As shown in FIG. 2A, in one or more embodiments, the glyph mask 210 comprises a monochrome image mask. Specifically, the glyph mask 210 is a monochrome image mask where each pixel of the monochrome image mask reflects whether a corresponding pixel of the digital image 200 portrays a glyph. Thus, as illustrated, a pixel 212 in the glyph mask 210 indicates that a corresponding pixel (i.e., a pixel portraying the letter "A") portrays a glyph.

It will be appreciated that although the glyph mask 210 portrays a plurality of exemplary pixels of a monochrome image mask (i.e., 49 total pixels), that the glyph mask 210 includes more pixels than shown. Specifically, the glyph mask 210 is an illustrative simplification of a glyph mask that includes pixels corresponding to each pixel of the digital image 200. Indeed, figures utilized throughout the present disclosure provide simplified entries or pixels corresponding to digital data such as images, arrays, databases, or spreadsheets, for the purposes of illustration, rather than the entirety of the digital data.

As mentioned previously, in addition to a glyph mask, the digital image enhancement system can also generate a color and illumination confidence map. FIG. 2B illustrates generating a color and illumination map from a digital image in accordance with one or more embodiments. For example, FIG. 2B illustrates the digital image 200 and generating a color and illumination confidence map 224 corresponding to the digital image 200.

As mentioned above, in one or more embodiments, a color and illumination confidence map the extent of luminosity and color corresponding to pixels in a digital image. Moreover, in one or more embodiments, a color and illumination map reflects the probability of a pixel corresponding to a background pixel based on color and luminosity. Indeed, because background pixels generally correspond to particular color and luminosity profiles (i.e., not colored and light), the color and illumination map indicates a probability that a pixel corresponds to a background pixel (or a glyph or graphic). For example, in one or more embodiments, a color and illumination map reflects a likelihood that a pixel in a digital image is gray and bright (i.e., corresponding to a background pixel).

Accordingly, in one or more embodiments, the digital image enhancement system combines luminosity and color measures to generate a color and illumination confidence map. Specifically, the digital image enhancement system can combine luminosity and color measures to generate a color and illumination confidence map such that higher values of the color and illumination confidence map correspond to grayscale pixels with high illumination and lower values of the color and illumination confidence map correspond to colored pixels or dark pixels.

The digital image enhancement system can utilize a variety of approaches to generate a color and illumination confidence map. In one or more embodiments, the digital image enhancement system converts a digital image to the CIE-Lab color space and utilizes luminosity values (e.g., "L" values in the Lab color space) and color values (e.g., "a" and/or "b" values in the Lab color space) to generate the color and illumination confidence map.

For example, in relation to FIG. 2B, the digital image enhancement system converts the digital image 200 to the CIE-Lab color space. The digital image enhancement system utilizes "a" and "b" values corresponding to the digital image to generate a confidence AB map 220 (also referred to herein as a "color confidence map") and utilizes the "L" values to generate a confidence L map 222 (also referred to herein as a "luminosity confidence map"). The confidence AB map 220 and the confidence L map 222 reflect luminosity and color values of the digital image 200 modified to a common scale. Moreover, the digital image enhancement system combines the confidence AB map 220 and the confidence L map 222 to generate the color and illumination confidence map 224.

With regard to the embodiment of FIG. 2B, the digital image enhancement system generates the confidence AB map 220 by converting "a" and "b" values to a scale ranging from 0 to 255. In particular, for each pixel in the digital image 200, the digital image enhancement system combines the "a" and "b" values. The digital image enhancement system then adjusts the combined "a" and "b" values across all pixels so that they range between 0 and 255.

In one or more embodiments, the digital image enhancement system also applies a maximum color threshold and minimum color threshold. Indeed, experimenters determined that without applying a maximum color threshold or minimum color threshold, the digital image enhancement system can skew the distribution of pixels across a chosen range. Accordingly, in one or more embodiments, if a combined "a" and "b" value exceeds a maximum color threshold, the digital image enhancement system replaces the combined "a" and "b" value with an extreme range value (e.g., 0, indicating high color). Similarly, if a combined "a" and "b" value falls below a minimum color threshold, the digital image enhancement system replaces the combined "a" and "b" value with an extreme range value (e.g., 255, indicating low color).

In relation to FIG. 2B, the result of converting "a" and "b" values to color confidence values is the confidence AB map 220. The color confidence values of the confidence AB map 220 indicate the likelihood (on a scale ranging from 0 to 255, with zero being the most color and 255 being the least color) that corresponding pixels of the digital image 200 correspond to low-color pixels (e.g., background pixel, rather than a graphic).

Similarly, with regard to the embodiment of FIG. 2B, the digital image enhancement system generates the confidence L map 222 by converting "L" values to a scale ranging from 0 to 255. In particular, for each pixel in the digital image 200, the digital image enhancement system identifies an "L" value from the CIE-Lab color corresponding to the pixel. Moreover, the digit image enhancement system adjusts the "L" values across all pixels so that they range between 0 and 255.

Similar to the confidence AB map 220, in one or more embodiments, the digital image enhancement system also applies a maximum luminosity threshold and minimum luminosity threshold in generating the confidence L map 222. Accordingly, in one or more embodiments, if "L" value exceeds a maximum color threshold, the digital image enhancement system replaces the "L" value with an extreme range value (e.g., 255, indicating a bright luminosity). Similarly, if an "L" value falls below a minimum color threshold, the digital image enhancement system replaces the "L" value with an extreme range value (e.g., 0, indicating a dark luminosity).

In relation to FIG. 2B, the result of converting "L" values to a luminosity confidence values is the confidence L map 222. The luminosity confidence values of the confidence L map 222 indicate the likelihood (on a scale ranging from 0 to 255, with zero being the most dark and 255 being the most bright) that corresponding pixels of the digital image 200 correspond to high luminosity pixels (e.g., background pixels, rather than text pixels).

As mentioned, in one or more embodiments, the digital image enhancement system combines the confidence AB map 220 and the confidence L map 222 to generate the color and illumination map 224. In particular, in relation to the embodiment of FIG. 2B, the digital image enhancement system generates the color and illumination map by comparing each of the color confidence values of the confidence AB map with the corresponding luminosity confidence values of the confidence L map and selecting the lower of the two values.

In other words, the digital image enhancement system compares color confidence values and luminosity confidence values and selects the value that indicates the lowest confidence (e.g., the most colorful or dark value, least likely to correspond to a background pixel). Accordingly, in relation to FIG. 2B, in order to have a high confidence value in the color and illumination confidence map 224, a pixel of the digital image 200 must be both gray and light. Conversely, a low confidence value in the color and illumination confidence map 224 indicates a pixel that is either colored or dark. Because background pixels tend to correspond to gray and light pixels, while graphics and text tend to correspond to colored or dark pixels, the color and illumination confidence map indicates a likelihood that each pixel corresponds to a background pixel (or to a graphic or a glyph).

The process of generating the color and illumination confidence map 224 can also be expressed in terms of an algorithm or a series of steps or equations. For example, in one or more embodiments, the digital image enhancement system utilizes the following high-level pseudocode to generate the color and illumination confidence map 224.

For every pixel in the input image (e.g., the digital image 200) set the value of the corresponding pixel in the grayscale bitmap according to the steps below. The values (L, a, b) in the steps below represent the values of the three components in the CIE-Lab color space.

First, calculate "confidence$_{AB}$" as described below:
1. Calculate metric$_{AB}$ as |a|+|b|.
2. If metric$_{AB}$ is less than experimentally determined threshold min$_{AB}$, set confidence$_{AB}$ to 255, else move to next condition.
3. If metric$_{AB}$ is more than min$_{AB}$, but less than second threshold max$_{AB}$, calculate confidence$_{AB}$ by the following formula:

$$\text{confidence}_{AB} = \left(\frac{\max_{AB} - \text{metric}_{AB}}{\max_{AB} - \min_{AB}}\right) * 255$$

Else, move to the next condition.
4. If metric$_{AB}$ is more than max$_{AB}$, set confidence to 0.

Next, calculate "confidence$_L$" as described below:
1. If L is less than experimentally determined threshold min$_L$, set confidence$_L$ to 0, else move to next condition.
2. If L is more than min$_L$, but less than a second experimentally determined threshold max$_L$, calculate confidence$_L$ by the following formula:

$$\text{confidence}_L = \left(\frac{L - \min_L}{\max_L - \min_L}\right) * 255$$

Else, move to the next condition.
3. If L is more than max$_L$, set confidence to 255.

Next, as we have "confidence$_{AB}$" and "confidence$_L$", set "CIconfidenceLevel" to the minimum of these two values.

Finally, set the value of the pixel in the grayscale bitmap to the same value as "CIconfidenceLevel". The resulting grayscale bitmap is a color and illumination confidence map (i.e., the color and illumination confidence map 224).

In addition, in one or more embodiments, the digital image enhancement system also keeps a count of pixels where confidence$_{AB}$ is 0. These pixels are most likely colored pixels. This information is useful in other steps to understand if the content of an image is predominantly colored or grayscale.

It will be appreciated that although the embodiment of FIG. 2A generates a color and illumination confidence map with particular values, over a particular range, utilizing a particular method and color space, the digital image enhancement system can generate a color and illumination confidence map with different values, over a different range, utilizing alternative steps, methods, color spaces, or processes. For example, in one or more embodiments, rather than generating a color and illumination confidence map where a high color and illumination confidence value corresponds to a gray and light pixel, the digital image enhancement system can make a low confidence value correspond to a gray and light pixel. Similarly, rather than making confidence values range from 0 to 255, in one or more embodiments, the digital image enhancement system can utilize a different range (e.g., 0 to 100 or 1 to 10). Moreover, rather than using the Lab color space, the digital image enhancement system can utilize a YCbCr color space, RGB color space, CMYK color space or some other color space.

As mentioned previously, in one or more embodiments, the digital image enhancement system utilizes a glyph mask and color and illumination confidence map to generate a cleaning confidence map. For example, FIG. 2C illustrates combining the glyph mask 210 and the color and illumination confidence map 224 to generate a cleaning confidence map 230.

In particular, in relation to the embodiment of FIG. 2C, the digital image enhancement system utilizes the glyph mask 210 to determine pixels corresponding to glyphs and generates modified confidence values in the cleaning confidence map 230 corresponding to the determined pixels corresponding to glyphs. Indeed, in one or more embodiments, the digital image enhancement system modifies glyph pixels less aggressively than background pixels. Accordingly, in one or more embodiments, the digital image enhancement system generates cleaning confidence values in a cleaning confidence map such that pixels corresponding to glyphs correspond to lower cleaning confidence values than pixels that do not correspond to glyphs.

Accordingly, in relation to FIG. 2C, the digital image enhancement system utilizes the glyph mask 210 to identify a first pixel 232a that does not correspond to a glyph (i.e., the value of the glyph mask for the first pixel 232a is 0). Moreover, the digital image enhancement system identifies a second pixel 234a that corresponds to a glyph (i.e., the value of the glyph mask for the second pixel 234a is 1). Similarly, the digital image enhancement system identifies a third pixel 236a that corresponds to a glyph.

With regard to FIG. 2C, for pixels that do not correspond to a glyph, the digital image enhancement system generates the cleaning confidence map 230 utilizing values directly from the color and illumination confidence map 224. Thus, as shown, because the first pixel 232a does not correspond to a glyph, the digital image enhancement system generates a first value 232c of the cleaning confidence map from a first value 232b of the color and illumination confidence map corresponding to the first pixel 232a. In other words, where a pixel does not correspond to a glyph (i.e., as indicated by the glyph mask 210), the digital image enhancement system utilizes the values of the color and illumination confidence map 224 for the corresponding values of the cleaning confidence map 230 (i.e., how aggressive the digital image enhancement system will clean particular digital pixels).

As shown in the exemplary embodiment of FIG. 2C, where a pixel corresponds to a glyph (as indicated by the glyph mask 210), the digital image enhancement system generates the cleaning confidence map 230 based on the color of the corresponding pixel (as indicated in the confidence AB map 220). More specifically, with regard to the embodiment of FIG. 2C, where a pixel corresponds to a glyph, the digital image enhancement system generates the cleaning confidence map 230 based on the value of the confidence AB map 220 corresponding to the pixel and one of two pre-determined confidence values. In particular, the digital image enhancement system utilizes a color glyph confidence value 238 or a grayscale glyph confidence value 240.

Specifically, if a pixel that corresponds to a glyph also corresponds to a low color confidence value from the confidence AB map 220 (i.e., a value indicating a colorful pixel, such as 0), the digital image enhancement system utilizes the color glyph confidence value 238 in the cleaning confidence map 230. Conversely, if a pixel that corresponds to a glyph also corresponds to a high color confidence from the confidence AB map 220 (i.e., a value indicating a gray pixel, such as a value greater than zero), the digital image enhancement system utilizes the grayscale glyph confidence value 240 in the cleaning confidence map 230.

Thus, with regard to the second pixel 234a, the digital image enhancement system determines that the pixel corresponds to a glyph (i.e., the glyph mask 210 includes a value of 1 for the second pixel 234a). Moreover, the digital image enhancement system determines that a corresponding second value 234b from the confidence AB map 220 is above a glyph color threshold (e.g., above 0). Therefore, the digital image enhancement system applies the grayscale glyph confidence value 240 (i.e., a value of 40) to a corresponding second value 234c of the cleaning confidence map 230.

Similarly, with regard to the third pixel 236a, the digital image enhancement system determines that the pixel corresponds to a glyph (i.e., the glyph mask 210 includes a value of 1 for the third pixel 236a). Moreover, the digital image enhancement system determines that a corresponding third value 236b from the confidence AB map 220 is at or below a glyph color threshold (e.g., 0). Therefore, the digital image enhancement system applies the color glyph confidence value 238 (i.e., a value of 20) to the third value 236c of the cleaning confidence map 230.

In one or more embodiments, a user of the digital image enhancement system selects/configures the glyph confidence values 238, 240. For example, in one or more embodiments, the glyph confidence values 238, 240 are configurable based on user input. In particular, in one or more embodiments, the digital image enhancement system allows a user to select how aggressively the digital image enhancement system will modify pixels corresponding to glyphs based on whether the glyphs are colored or gray.

In other embodiments, the digital image enhancement system selects the glyph confidence values 238, 240 based on other factors. For example, in one or more embodiments, the digital image enhancement system selects the glyph confidence values 238, 240 based on the glyph mask 210 and/or the color and illumination confidence map 224. In particular, in a digital image with a large number of glyphs (e.g., the glyph mask 210 indicates a large number of pixels correspond to glyphs), the digital image enhancement system can decrease the glyph confidence values 238, 240 (i.e., to avoid cleaning text too aggressively). Similarly, in one or more embodiments, the digital image enhancement system can modify the glyph confidence values 238, 240 relative to the values of the color and illumination confidence map 224 (e.g., lower the glyph confidence values 238, 240 based on low confidence values in the color and illumination confidence map 224).

The process of generating the cleaning confidence map 230 can also be described in terms of an algorithm or a series of steps or equations. For example, in one or more embodiments, the digital image enhancement system utilizes the following high-level pseudocode to generate the cleaning confidence map 230.

1. For every pixel in the original image (e.g., the digital image 200), get the value of the corresponding pixel in the Color and Illumination Map, vCIC. Set $v_{cc}$ (value of the cleaning confidence map) to $v_{CIC}$ (value of the color and illumination confidence map).
2. Check if the corresponding pixel is set in the text glyph mask.
   a. If the corresponding pixel is not set in the text glyph mask, move to step 3.
   b. If the pixel is set in the text glyph mask, then determine the color content of the pixel. The higher the color content, the lower the cleaning confidence value for the pixel. One such method is to use the value of confidence$_{AB}$.
      i. If confidence$_{AB}$ is set to 0, set $v_{cc}$ to a determined value $v_{cc\text{-}color}$. The value of $v_{cc\text{-}color}$ can be interactively set by the user to control the aggressiveness of the cleaning.
      ii. If confidence$_{AB}$ is not set to 0, set $v_{cc}$ to a determined value $v_{cc\text{-}gray}$. The value of $v_{cc\text{-}gray}$ can also be interactively set by the user.
3. Set the value of the corresponding pixel in the Cleaning Confidence Map to $v_{cc}$ as calculated in the previous steps.

In one or more embodiments, the digital image enhancement system utilizes the foregoing steps to generate the cleaning confidence map 230, a single channel bitmap with values ranging from 0 to 255. The values of the cleaning confidence map 230 indicate a likelihood that corresponding pixels of the digital image 200 correspond to background pixels (i.e., gray, light pixels, that do not portray glyphs). Accordingly, in one or more embodiments, the cleaning confidence values of the cleaning confidence map 230 also indicate how aggressively the digital image enhancement system will modify corresponding pixels of the digital image 200 (i.e., clean background pixels more aggressively than foreground pixels corresponding to glyphs or text).

It will be appreciated that although the cleaning confidence map 230 in relation to FIG. 2C is expressed in a particular format, with particular values, generated utilizing a particular method, the digital image enhancement system can utilize other formats, values, and methods. For example, rather than utilizing a single channel bitmap image ranging from 0 to 255, the digital image enhancement system can utilize an array, table, spreadsheet, or other digital data format with a different range of values to represent the cleaning confidence map.

Because one or more embodiments described in relation to FIGS. 2A-2C utilize bitmaps or other image data, it is possible to generate images illustrating the appearance of a glyph mask, color and illumination confidence map, and cleaning confidence map. For example, FIG. 2D illustrates a representation of a glyph mask, color and illumination confidence map, and cleaning confidence map in accordance with one or more embodiments. In particular, FIG. 2D illustrates the original digital image 102, a glyph mask 250 generated from the original digital image 102, a color and illumination confidence map 260 generated from the original digital image 102, and a cleaning confidence map 270 corresponding to the original digital image 102.

As shown, the glyph mask 250 indicates pixels corresponding to glyphs (i.e., text characters). Moreover, the color and illumination confidence map 260 indicates glyphs and graphics based on color and luminosity corresponding to each pixel. In addition, the cleaning confidence map 270 combines the glyph mask 250 and color and illumination confidence map 260 to identify pixels corresponding to glyphs and/or graphics based on color, luminosity, and a determination of whether pixels correspond to glyphs. Moreover, the cleaning confidence map 270 indicates how aggressively the digital image enhancement system will modify (e.g., clean) pixels.

For example, as mentioned above, the digital image enhancement system can utilize a cleaning confidence map to clean one or more shadows from a digital image. In particular, the digital image enhancement system can generate a modified local luminance map (also referred to herein as an "upper surface") and utilize the modified local luminance map together with a cleaning confidence map to remove one or more shadows. For example, FIGS. 3A-3C, illustrate generating a modified local luminance map and utilizing the modified local luminance map with a cleaning confidence map to clean one or more shadows.

Figure 3A:
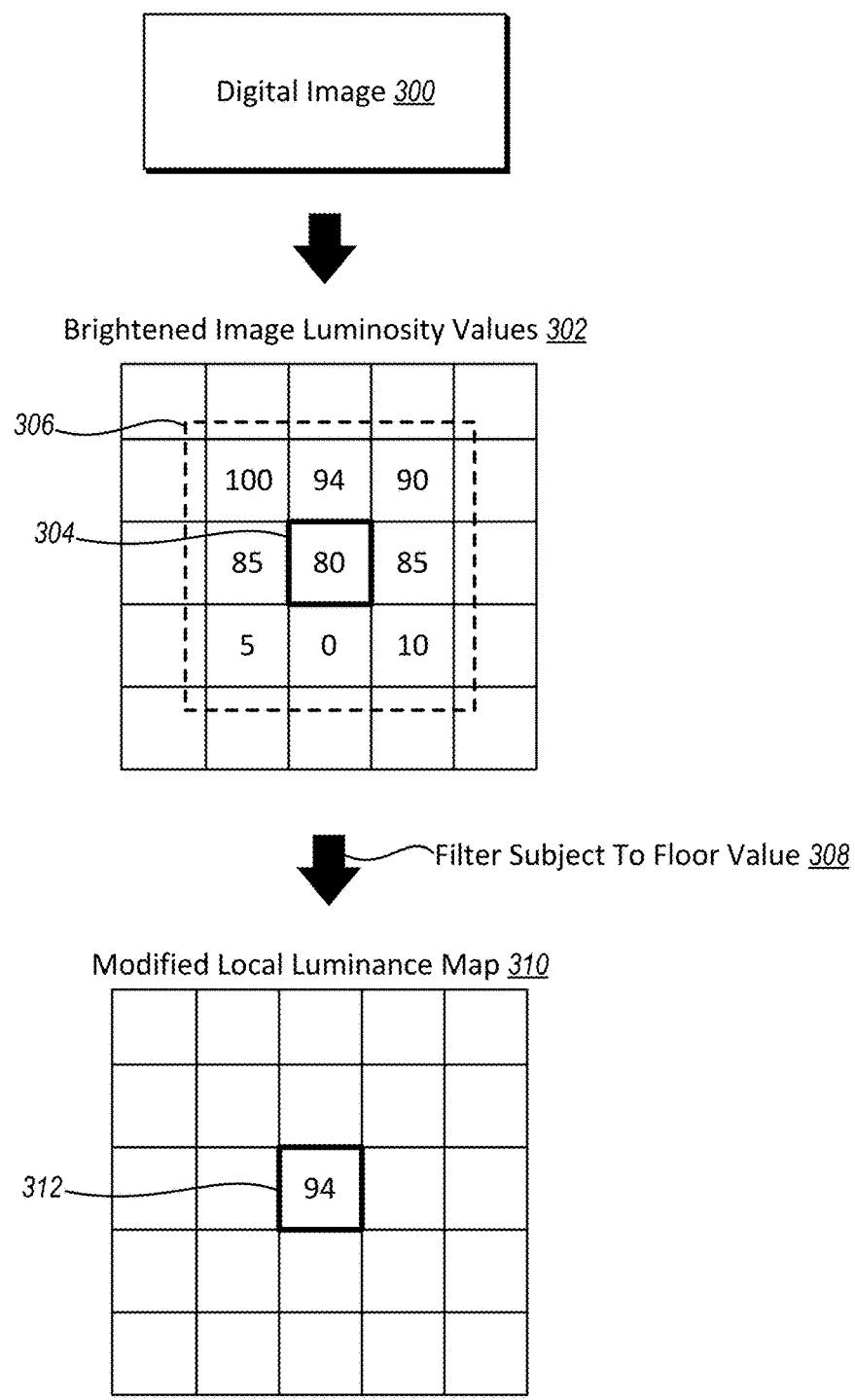
FIG. 3A illustrates a representation of generating a modified local luminance map based on a brightened digital image in accordance with one or more embodiments.
Figure 3B:
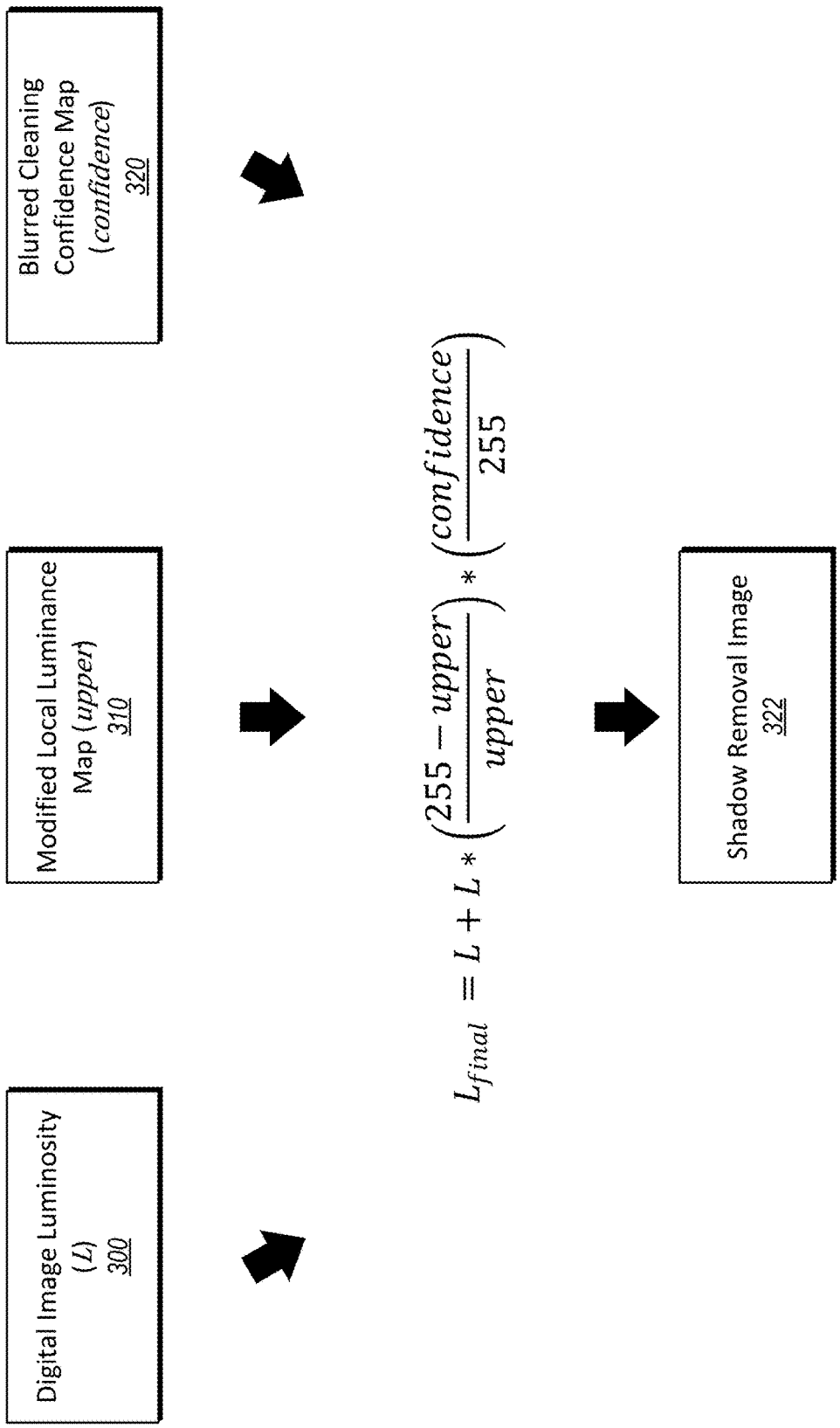
FIG. 3B illustrates a representation of utilizing the modified local luminance map and a cleaning confidence map to generate a shadow removal image in accordance with one or more embodiments.
Figure 3C:
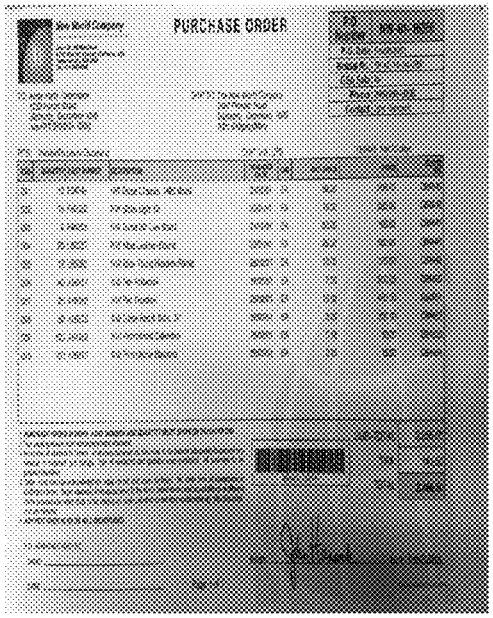
FIG. 3C illustrates a representation of a brightened digital image, a modified local luminance map, a blurred cleaning confidence map, and a shadow removal image in accordance with one or more embodiments.
Figure 3C:
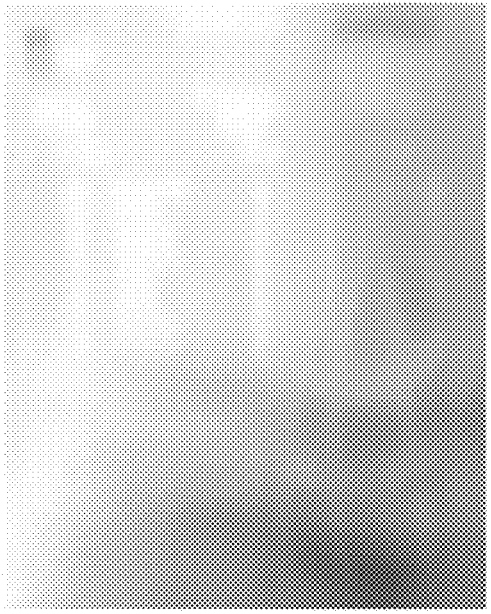
Figure 3C:
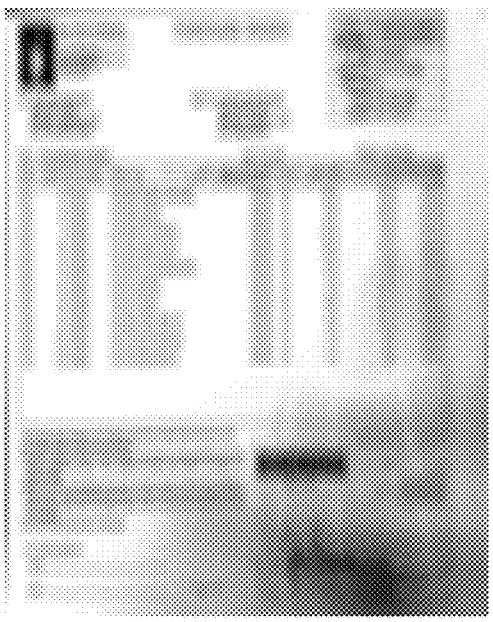
Figure 3C:
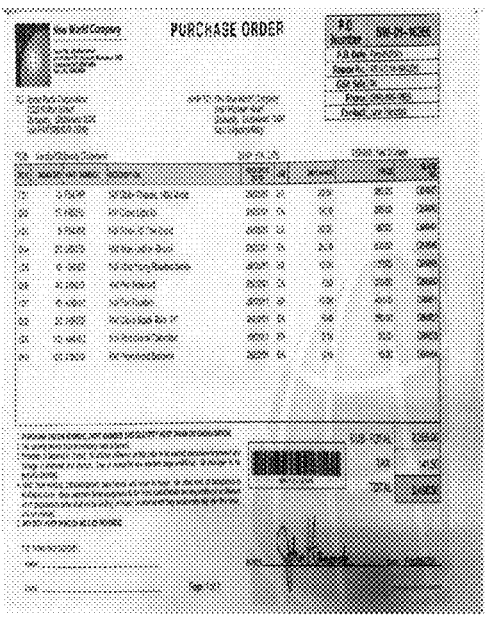

In particular, FIG. 3A illustrates a digital image 300 (e.g., the original digital image 102 or the digital image 200). Moreover, FIG. 3A shows the digital image enhancement system generating brightened image luminosity values 302 from the digital image 300 and utilizing the brightened image luminosity values to generate a modified local luminance map 310.

As shown in FIG. 3A, the digital image enhancement system increases the brightness of the digital image 300. Brightening the image assists the image enhancement system in at least two ways. First, brightening the image lightens shadows in the image, which improves the quality of the document and increases the effectiveness (e.g., sensitivity) of other steps. In addition, experimenters have discovered that brightening the image prior to removing shadows reduces background noise in the digital image.

The digital image enhancement system can utilize a variety of image brightening techniques. With regard to FIG. 3A, the digital image enhancement system brightens the digital image 300 utilizing a luminosity histogram stretching technique. In particular, the digital image enhancement histogram isolates luminosity values corresponding to the digital image 300 (e.g., "Y" values or "L" values) and generates a luminosity histogram (e.g., the number or percentage of digital images that correspond to particular luminosity values). The digital image enhancement system then stretches the luminosity histogram towards higher luminosity values. For example, one or more embodiments of the digital image enhancement system utilize the following pseudocode:
1. Create a histogram of luminosity values for all pixels of the image.
2. Find the extents of the major cluster of the histogram. This can be done by dropping very low frequencies from the histogram. The extents found are $L_{high}$ and $L_{low}$.
3. Use a linear scaling formula for a new L value such that the new histogram extents are $L_{max}$ and $L_{low}$. Typical value of $L_{max}$ is 255.
4. Calculate the new L values for each pixel using the calculated formula.

The digital image enhancement system utilizes this approach in relation to FIG. 3A to generate the brightened image luminosity values 302. In particular, each of the brightened image luminosity values 302 reflect a brightened luminosity value (upon luminosity histogram stretching) corresponding to a pixel of the digital image 300.

After brightening a digital image, in one or more embodiments, the digital image enhancement system builds a modified local luminance map. In particular, the digital image enhancement system can generate a modified local luminance map where each value of the map is set to the highest luminance level in a configurable window surrounding the pixel in an original image. Moreover, in one or more embodiments, the digital image enhancement system applies a high-level filter to the surrounding luminosity levels (e.g., to eliminate outliner values) together with a floor value (e.g., to reduce the inclusion of artifacts in a final digital image after removing shadows).

For example, as shown in FIG. 3A, the digital image enhancement system applies a filter subject to floor value 308. Specifically, the digital image enhancement system generates a window 306 in relation to a pixel 304. As shown, the window 306 encompasses eight pixels surrounding the pixel 304. The size of the window 306 is configurable (e.g., based on user input). Accordingly, the window 306 can include greater or fewer pixels than illustrated in FIG. 3A.

As shown, the high value in the window 306 surrounding the pixel 304 is 100. Accordingly, in one or more embodiments, the digital image enhancement system replaces the pixel 304 with the value 100. However, as just mentioned, in one or more embodiments, the digital image enhancement system applies a high-level filter to the luminosity levels. In particular, in relation to FIG. 3A, the digital image enhancement system utilizes a 95 percent high-level filter, that excludes luminosity levels in the 95th percentile of the distribution in the window. As mentioned, utilizing a high-level filter eliminates outliers that may skew the resulting modified local luminance map 310.

Because the distribution in the window 306 ranges from 0 to 100, the digital image enhancement system removes luminosity levels greater than 95 in analyzing the window 306. In particular, the digital image enhancement system replaces the pixel 304 with the highest remaining luminosity value after application of the high-level filter. Accordingly, the digital image enhancement system replaces the pixel 304 with a value of 94 (the highest remaining value in the window 306). Thus, as shown in FIG. 3A, pixel 312 in the modified local luminance map 310 that corresponds to the pixel 304 is set to a value of 94.

In addition to applying a high-level filter, in one or more embodiments, the digital image enhancement system also utilizes a configurable floor value (e.g., the filter subject to the floor value 308). In particular, the digital image enhancement system utilizes a floor value that defines the lowest allowable value in the modified local luminance map 310. For example, if the floor value were set to 50, the digital image enhancement system would identify any entry in the modified local luminance map 310 lower than the floor value (i.e., 45) and replace the entry with the floor value (i.e., 50).

As mentioned, in some circumstances, artifacts appear in a final digital image upon cleaning one or more shadows, in particular with regard to darker areas of an image (e.g., areas with graphics or reverse text). Experimenters have discovered that use of a floor value in generating the modified local luminance map prevents the creation of artifacts in the darker areas of the image. In one or more embodiments, the floor value can be interactively changed (e.g., based on user input) to control the intensity of cleaning.

Furthermore, in one or more embodiments, the digital image enhancement system applies a blur filter to the modified local luminance map 310. As used herein, a "blur filter" is a process, equation, and/or algorithm applied to digital data (e.g., a digital image, bitmap, database, spreadsheet, or array) that makes variation in the digital data less distinct. In particular, in one or more embodiments, the term "blur filter" includes an averaging filter. For example, in one or more embodiments, a "blur filter" replaces a data value with an average of surrounding data values within a window. By replacing data values with an average of surrounding data values, the "blur filter" reduces distinctions (e.g., lines, text, graphics, etc.) in a digital image. Similarly, the term "blur filter" can also include a median filter. For example, in one or more embodiments, a "blur filter" replaces a data value with a median of surrounding data values within a window.

In one or embodiments, the digital image enhancement system, generates the modified local luminance map 310 by applying a blur filter (e.g., upon application of the filter subject to the floor value 308 to smooth sharp changes in luminosity).

It will be appreciated that although the embodiment of FIG. 3A utilizes a particular percentile (e.g., 95%) in relation to a high-level filter, the digital image enhancement system can utilize a variety of percentiles. For example, in one or more embodiments, the digital image enhancement system enables users to configure the percentile to apply to the high-level filter. In addition, in one or more embodiments, the digital image enhancement system selects the percentile based on the digital image 300. For example, the digital image enhancement system can select a percentile based on a distribution or variation of luminosity within an image (e.g., the higher the variation in luminosity across a digital image the lower the percentile, so as to remove additional outliers).

In addition, it will be appreciated that although FIG. 3A illustrates a single pixel 312 of the modified local luminance map 310 as having a value, the embodiment of FIG. 3A repeats the process described above to generate a value in the modified local luminance map 310 that corresponds to each pixel in the digital image 300. Accordingly, the digital image enhancement system generates the modified local luminance map 310 such that each entry of the modified local luminance map 310 corresponds to a pixel of the digital image 300 and reflects luminosities of a set of pixels surrounding the pixel of the digital image 300.

The process of generating the modified local luminance map 310 can also be expressed in terms of an algorithm or a series of steps or equations. In one or more embodiments, the digital image enhancement system utilizes the following pseudocode to generate the modified local luminance map 310:

1. Create a bitmap containing the luminosity channel (e.g., L channel or Y channel) of the original bitmap (i.e., the digital image 300), representing the luminosities of each pixel. These values range from 0 to 255.
2. Create an intermediate upper surface as follows:
    a. For each pixel in the bitmap created in the previous step, calculate $L_{upper}$ as follows:
        i. Create a window of size around the pixel, with the pixel at the center.
        ii. Find the luminosity value that is at the 95% percentile of the luminosity value distribution for the window, call this $L_{max}$.
        iii. If $L_{max}$ is more than the previously configured floor value (i.e., luminosity floor threshold), set $L_{upper}$ to $L_{max}$ else set $L_{upper}$ to the floor value.
    b. Set the value of $L_{upper}$ as the value of the corresponding gray pixel in the upper surface.
3. Apply an averaging filter on the grayscale bitmap created in the previous step to get the final upper surface (i.e., the modified local luminance map 310).

In addition to the foregoing steps, in one or more embodiments, the digital image enhancement system incorporates modifications to the above-recited pseudocode to further reduce processing time and utilization of computing resources. In particular, 1'. In step 2 recited above, instead of calculating the $L_{upper}$ for every pixel, divide the image into blocks, find the $L_{upper}$ for the center pixel and use the same $L_{upper}$ for all pixels in that block. For example, experimenters have determined that, in one or more embodiments, the block size should not be more than one-tenth of the window size to ensure a reasonable tradeoff between accuracy and speed.
2'. In step 3 recited above, instead of directly applying the blur filter, perform the following steps:
    a. Downsize the bitmap by a factor '$k_{win}$'.
    b. Apply the blur filter (e.g., averaging filter) on the output with a window size of $$\frac{w_{avg}}{k_{win}}$$

(where $w_{avg}$ is the window size of the from step 2 above).
    c. Upsize this image by the same factor '$k_{win}$' to get an image with the original dimensions.
    d. Apply a blur filter (e.g., an averaging filter) on this image with window size '$k_{win}$'.

With regard to the value of "$k_{win}$," experimenters have determined optimal values for various embodiments. For example, experimenters have determined that the optimal value of $k_{win}$ in at least one embodiment is 8. This value boosted the speed of the digital image enhancement system without having a significant impact on the accuracy of the modified local luminance map 310.

Because the digital image enhancement system generates the modified local luminance map 310 utilizing a brightened image and a high-value filter, the modified local luminance map 310 more clearly identifies pixels that correspond to shadows. For example, following the above approach, low values in the modified local luminance map 310 correspond to dark pixels in the digital image 300 that are also surrounded by dark pixels. Accordingly, the modified local luminance map 310 provides a reasonable indicator of pixels within the digital image 300 that correspond to shadows.

In one or more embodiments, the digital image enhancement system utilizes the modified local luminance map 310 to adjust the digital image 300 and remove one or more shadows. For example, in one or more embodiments, the digital image enhancement system takes the luminance value of a pixel from the modified local luminance map 310 and pushes the value towards the lighter end of the spectrum. In particular, the digital image enhancement system can modify the luminosity of pixels based on the relative darkness of the value in the modified local luminance map 310 (i.e., such that darker images corresponding to shadows are lightened more than brighter images).

For instance, in one or more embodiments, the digital image enhancement system applies the following equation:

$$L_{new} = L + L * \left(\frac{255 - \text{upper}}{\text{upper}}\right)$$

where L is a luminosity of a pixel in the digital image 300 and upper is the value of the modified local luminance map 310 (i.e., the upper surface). The result of this operation is that shadowed areas, which are naturally darker, are adjusted more (i.e., removed from the digital image).

In some circumstances, however, the modified local luminance map 310 may indicate some low values (i.e., dark areas) that do not correspond to pixels portraying shadows. For example, a dark graphic can include dark pixels surrounded by other dark pixels. Applying an algorithm to remove shadows without being aware of the content could result on fading or removing glyphs and/or graphics in a digital image. Accordingly, in one or more embodiments, the digital image enhancement system utilizes a modified local luminance map in conjunction with information regarding the content of the pixels in removing shadows. In particular, the digital image enhancement system utilizes a modified local luminance map and a cleaning confidence map (e.g., a blurred cleaning confidence map) to remove shadows.

For example, FIG. 3B illustrates utilizing a blurred cleaning confidence map 320 in conjunction with the modified local luminance map 310 to modify the digital image 300 (i.e., a luminosity channel of the digital image 300). In particular, FIG. 3B illustrates generating a shadow removal image 322 from the digital image 300 utilizing the modified local luminance map 310 and the blurred cleaning confidence map 320.

As illustrated in FIG. 3B, in one or more embodiments, the digital image enhancement system utilizes the blurred cleaning confidence map 320. A blurred cleaning confidence map is a cleaning confidence map upon application of a blur filter. For example, in relation to FIG. 3B, the blurred cleaning confidence map 320 reflects a cleaning confidence map (e.g., the cleaning confidence map 230) upon application of an averaging filter. Experimenters have determined that utilizing a blur filter to smooth sharp changes in the cleaning confidence values yields better results (more accurate and clean removal of shadows).

By applying the blurred cleaning confidence map 320, the aggressiveness of luminance adjustment is tuned for each individual pixel depending on the cleaning confidence for that pixel. Accordingly, dark pixels that correspond to low cleaning confidences (i.e., glyphs or graphics) are modified less aggressively than dark pixels that correspond to high cleaning confidences (i.e., background pixels with shadows).

As illustrated in FIG. 3B, in one or more embodiments, the digital image enhancement system utilizes the following equation to generate the shadow removal image 322:

$$L_{final} = L + L * \left(\frac{255 - \text{upper}}{\text{upper}}\right) * \left(\frac{\text{confidence}}{255}\right)$$

where $L_{final}$ is the final luminosity of a pixel in the shadow removal image 322, L is a luminosity of a pixel in the digital image 300, upper is a value of the modified local luminance map 310 (i.e., the upper surface), and confidence is a value of the blurred cleaning confidence map 320. The result of this operation is that the digital image enhancement system adjusts shadowed areas, which are naturally darker, to a greater degree where the content of the pixel corresponds to a high confidence level (e.g., not a glyph or graphic).

The final luminosity can also be expressed in terms of an adjustment to the luminosity calculated based on the modified local luminance map 310. For example, the final luminosity of pixels in the shadow removal image 322 can also be calculated:

$$L_{final} = L_{new} * \left(\frac{\text{confidence}}{255}\right) * k_{shadow}$$

where $k_{shadow}$ is a constant for adjusting luminosity in shadow removal.

The process of generating the shadow removal image 322 can also be expressed in terms of an algorithm or a series of steps or equations. For example, in one or more embodiments, the digital image enhancement system utilizes the following high-level pseudocode to generate the shadow removal image 322.

1. Convert the image to the $YC_bC_r$ color space (or CIE-Lab color space).
2. For every pixel, do the following steps:
    a. Fetch from the upper surface, the value of the corresponding pixel, call it 'upper.'
    b. Fetch from cleaning confidence map, the value of the corresponding pixel, call it 'confidence'.
    c. Calculate a $L_{final}$ value using the formula below (L is the original luminosity, such as a Y-channel value or L-channel value for the pixel):

$$L_{final} = L + L * \left(\frac{255 - \text{upper}}{\text{upper}}\right) * \left(\frac{\text{confidence}}{255}\right)$$

d. Set the Y-channel value (or L-channel value) of the pixel as $L_{final}$, leaving the other channel values (e.g., $C_b$ and $C_r$) unchanged.
3. Convert the image back to the original color space.

As mentioned above, in one or more embodiments, the digital image enhancement system expresses the brightened image luminosity values 302, the modified local luminance map 310, the blurred cleaning confidence map 320, and the shadow removal image 322 as images. For example, FIG. 3C illustrates image representations of a brightened image 330 (i.e., based on brightened image luminosity values), a modified local luminance map 340, a blurred cleaning confidence map 350, and a shadow removal image 360 based on application of one or more embodiments of the digital image enhancement system to the original digital image 102.

Notably, the shadow removal image 360 no longer includes the shadow 108 included in the original digital image 102. Rather, the upper right hand area of the shadow removal image 360 is lightened, while the text in the upper right hand corner remains clear and dark. This is a result of applying the modified local luminance map 340 in conjunction with the blurred cleaning confidence map 350. The modified local luminance map 340 identifies pixels that are part of the shadow 108 and the blurred cleaning confidence map 350 reduces (relatively) adjustments to glyphs and/or images.

Figure 4A:
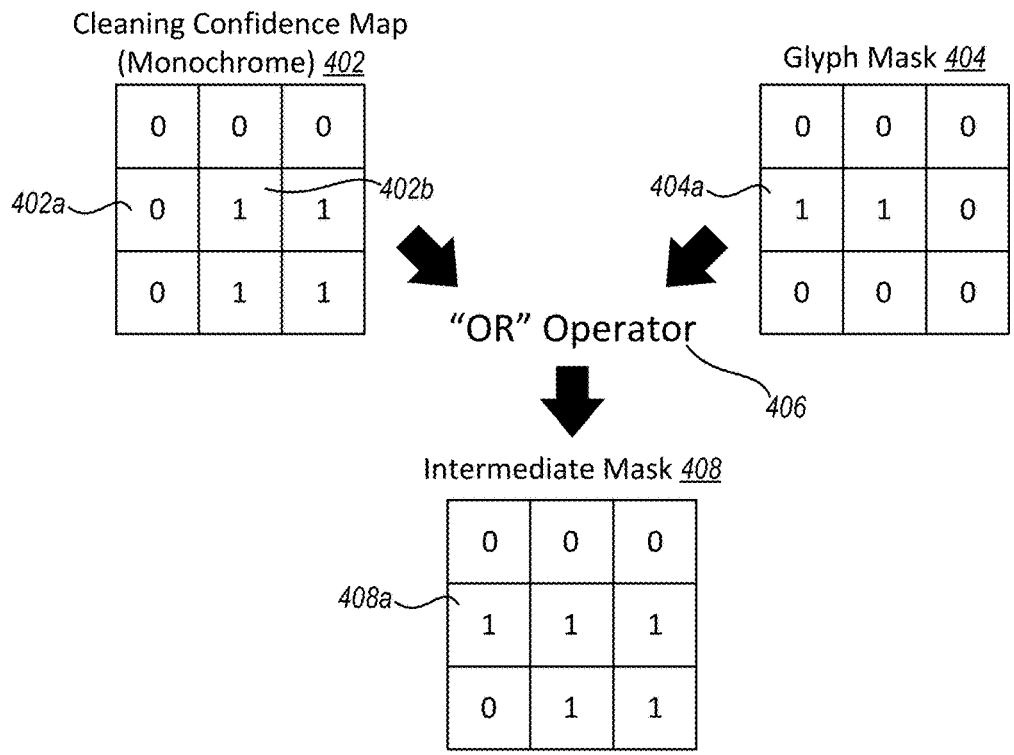
FIG. 4A illustrates a representation of combining a cleaning confidence map and a glyph mask to generate an intermediate mask in accordance with one or more embodiments.
Figure 4B:
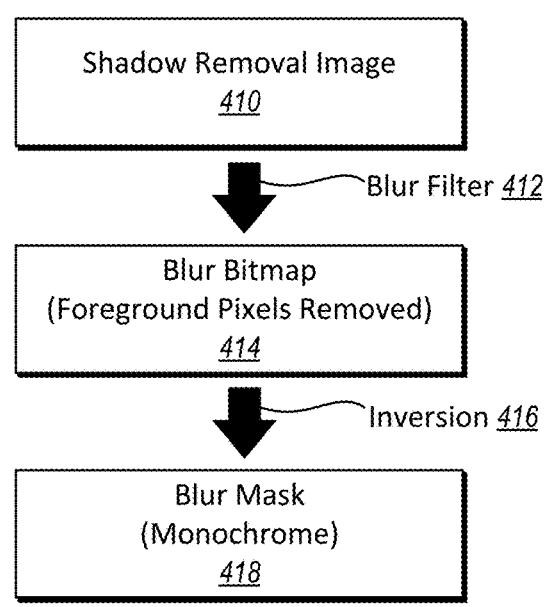
FIG. 4B illustrates a representation of applying a blur filter to a shadow removal image to generate a blur mask in accordance with one or more embodiments.
Figure 4C:
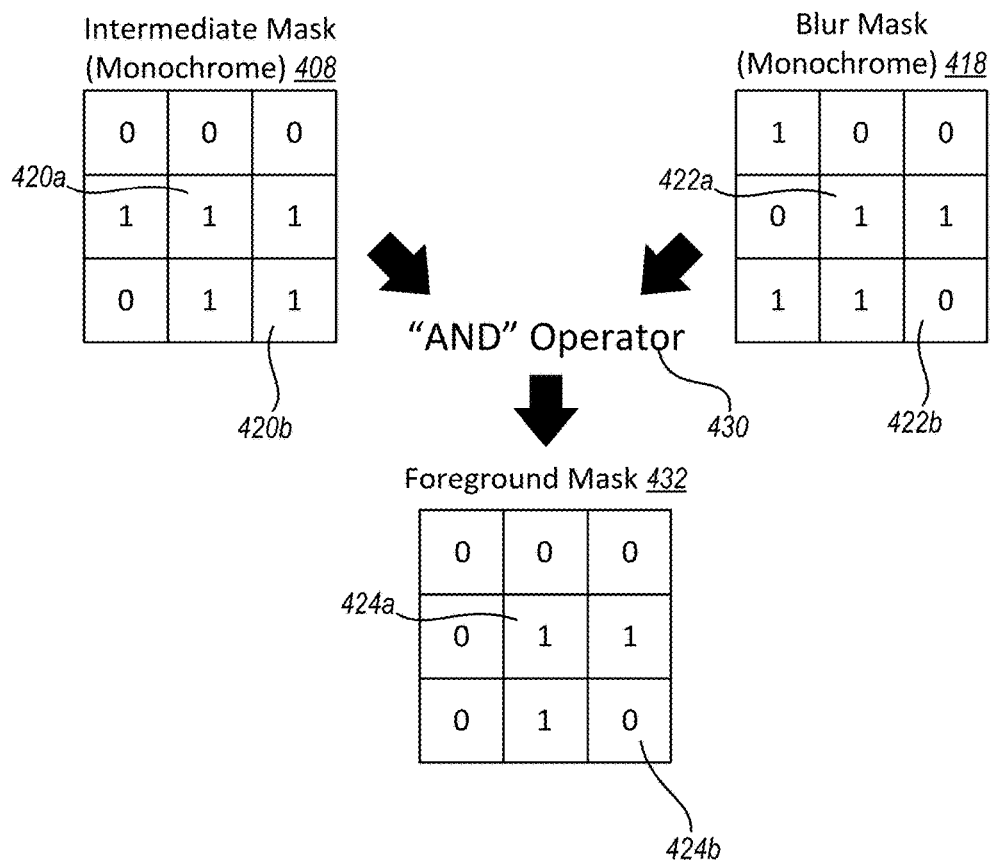
FIG. 4C illustrates a representation of combining an intermediate mask and a blur mask to generate a foreground mask in accordance with one or more embodiments.
Figure 4D:
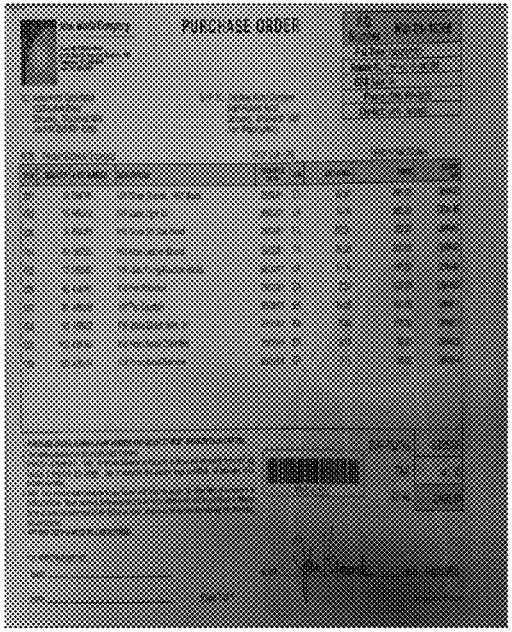
FIG. 4D illustrates representations of an original digital image, an intermediate mask, a blur mask, and a foreground mask in accordance with one or more embodiments.
Figure 4D:
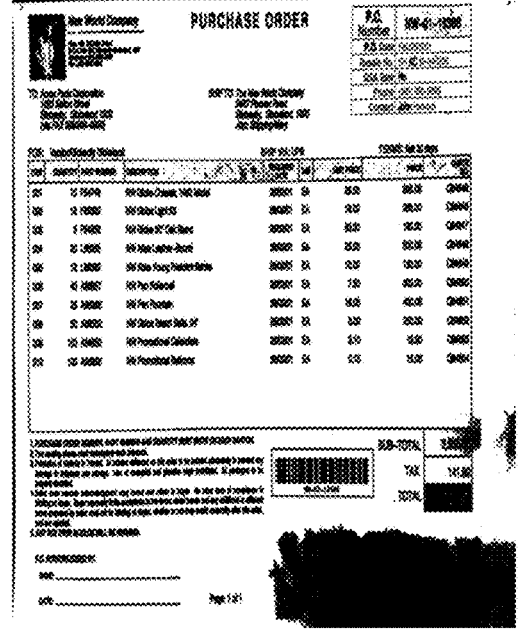
Figure 4D:
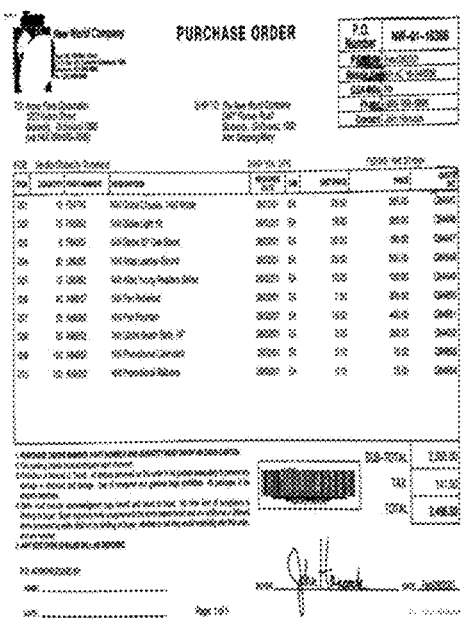
Figure 4D:
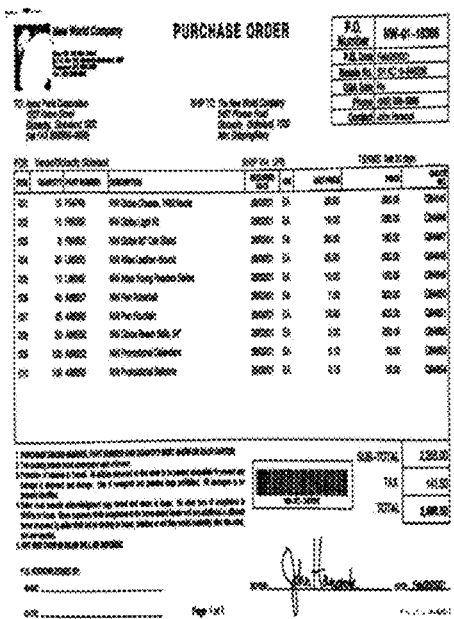
Figure 4E:
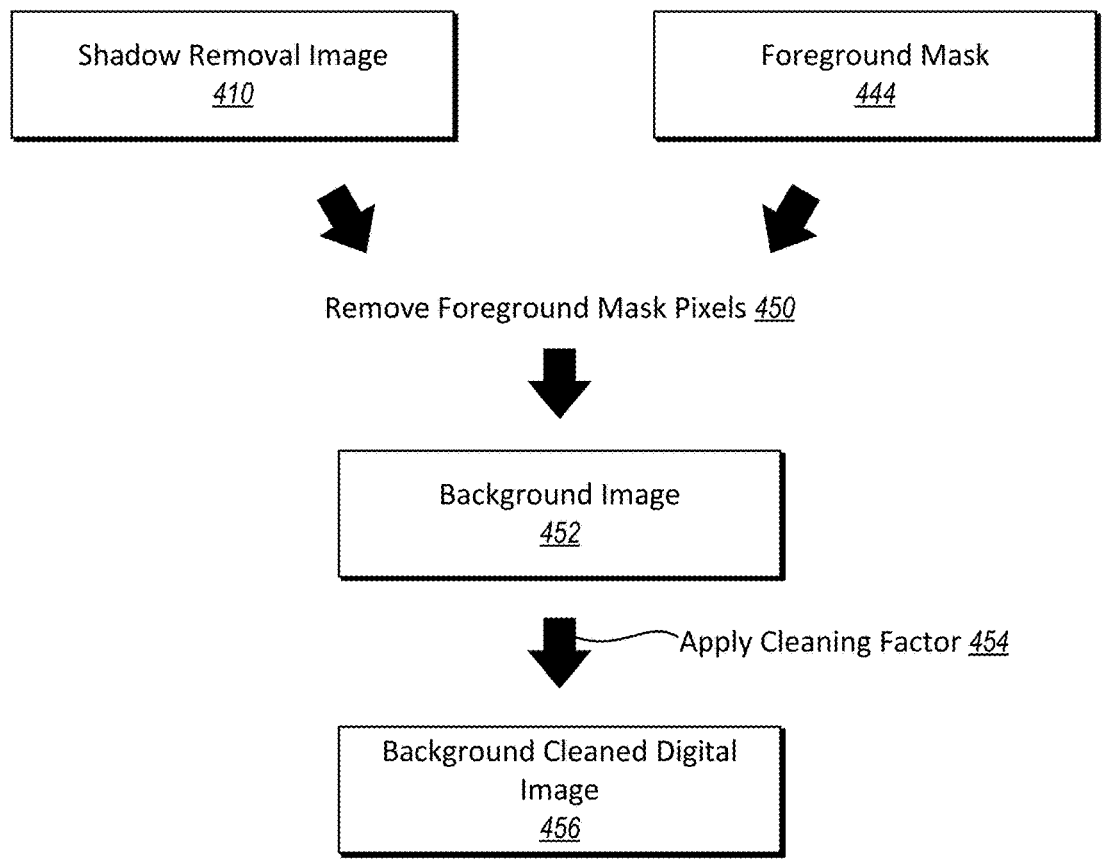
FIG. 4E illustrates a representation of generating a background cleaned digital image based on a foreground mask and a shadow removal image in accordance with one or more embodiments.
Figure 4F:
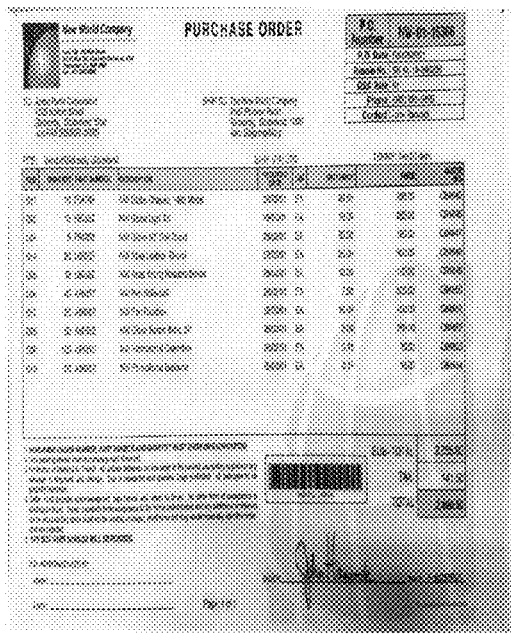
FIG. 4F illustrates representations of a shadow removal image and a background cleaned digital image in accordance with one or more embodiments.
Figure 4F:
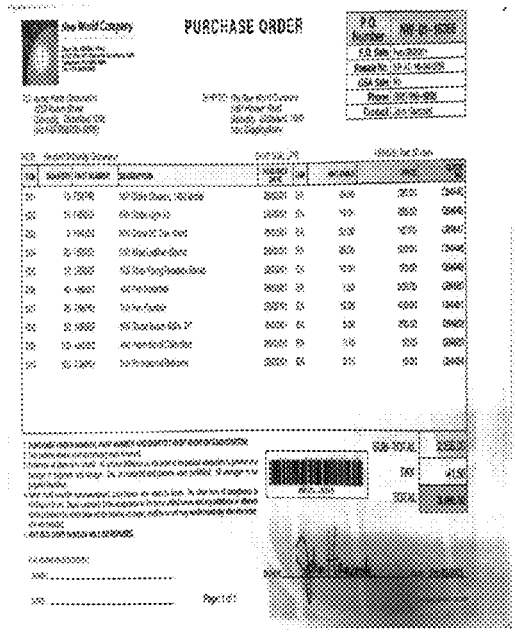

Turning now to FIGS. 4A-4F, additional detail will be provided regarding utilizing a cleaning confidence map in relation to background cleaning of a digital image. In particular, FIG. 4A illustrates generating an intermediate mask utilizing a confidence map and glyph mask, FIG. 4B illustrates generating a blur mask from a shadow removal image, FIG. 4C illustrates utilizing an intermediate mask and a blur mask to generate a foreground mask, and FIG. 4D illustrates image representations of an original image, an intermediate mask, a blur mask, and a foreground mask in accordance with one or more embodiments. Furthermore, FIG. 4E illustrates utilizing a foreground mask to generate a background cleaned image from a shadow removal image, and FIG. 4F illustrates image representations of a shadow removal image and a background cleaned image.

As mentioned above, in one or more embodiments, the digital image enhancement system decomposes an image into two layers: the foreground and background. In particular, the digital image enhancement system can separate text and graphics from the background pixels of a digital image. The digital image enhancement system can utilize any suitable method for separating text and graphics for this purpose. The embodiments described in relation to FIG. 4A-4D generate a foreground mask that reflect text and graphics with a high degree of accuracy utilizing a cleaning confidence map.

For example, FIG. 4A illustrates a cleaning confidence map 402 and a glyph mask 404 utilized to generate an intermediate mask 408 utilizing an "or" operator 406. As illustrated, the cleaning confidence map 402 is expressed as a monochrome image. In particular, in relation to the embodiment of FIG. 4A, the digital image enhancement system generates the cleaning confidence map 402 by converting a cleaning confidence map expressed as a grayscale image (e.g., the cleaning confidence map 230) into a monochrome image.

The digital image enhancement system can utilize a variety of algorithms to convert a grayscale image (i.e., a grayscale cleaning confidence map) into a monochrome image (i.e., a monochrome cleaning confidence map). In one or more embodiments, the digital image enhancement system utilizes a hysteresis binarization algorithm. Hysteresis binarization is a thresholding approach. In particular, in one or more embodiments, the digital image enhancement system utilizes a hysteresis binarizaiton algorithm that analyzes a pixel to determine if the pixel is above an upper threshold. If so, the digital image enhancement system identifies the pixel as satisfying the threshold. The digital image enhancement system also searches the surrounding pixels recursively. If the values of the surrounding pixels are greater than a lower threshold, they are also identified as satisfying the threshold. Applying hysteresis binarization results in a relatively noise-free monochrome image while preserving indications of text and graphics present in the digital image.

Accordingly, in relation to FIG. 4A, the digital image enhancement system applies a hysteresis binarization algorithm to a grayscale cleaning confidence map and generates the cleaning confidence map 402. As shown, the cleaning confidence map 402 is a monochrome image that identifies pixels corresponding to graphics or text based on luminosity and color of a digital image (e.g., utilizing the color and illumination confidence map 224) and whether each pixel portrays text (e.g., utilizing the glyph mask 210). Specifically, the first value 402a (i.e., marked as a "0") indicates a pixel that is likely to correspond to a background pixel while the second value 402b (i.e., marked as a "1") reflects a pixel that is likely to correspond to a foreground pixel.

As illustrated in FIG. 4A, the digital image enhancement system combines the cleaning confidence map 402 with the glyph mask 404. The glyph mask 404 is a mask that identifies pixels corresponding to text in a digital image (e.g., the glyph mask 210). Thus, the value 404a (i.e., marked as a "1") in the glyph mask 404 indicates a pixel that corresponds to a glyph.

As shown in FIG. 4A, by combining the cleaning confidence map 402 and the glyph mask 404, the digital image enhancement system can generate the intermediate mask 408. Specifically, the digital image enhancement system combines the cleaning confidence map 402 and the glyph mask 404 with the "or" operator 406. Accordingly, if either the cleaning confidence map 402 or the glyph mask 404 indicate that a pixel corresponds to a foreground pixel, the pixel is affirmatively marked as a foreground pixel in the intermediate mask 408. Thus, although the first value 402a is marked as a 0, because the corresponding second value 404a is marked as a 1, the corresponding third value 408a of the intermediated mask 408 is marked as a 1 after application of the "or" operator 406.

Accordingly, the intermediate mask 408 is a combination of the cleaning confidence map 402 and the glyph mask 404 that is broader than the cleaning confidence map 402 and the glyph mask 404 in relation to identifying foreground pixels. In particular, the intermediate mask 408 indicates pixels that are likely to correspond to foreground pixels if the corresponding pixels are affirmatively indicated in either the cleaning confidence map 402 or the glyph mask 404.

In addition to an intermediate mask, in one or more embodiments, the digital image enhancement system also generates a blur mask in segregating foreground pixels from background pixels. In particular, in one or more embodiments, the digital image enhancement system applies a blur filter to a digital image to generate a blur mask that is utilized to segregate foreground pixels.

For example, FIG. 4B illustrates a shadow removal image 410. The digital image enhancement system applies a blur filter 412 to the shadow removal image 410 to generate a blur bitmap 414. Moreover, the digital image enhancement system applies an inversion 416 to the blur bitmap 414 to generate a blur mask 418.

The shadow removal image 410 can comprise any shadow removal image generated in relation to an original digital image. For example, the shadow removal image can comprise the shadow removal image 360.

It will be appreciated that, in one or more embodiments, the digital image enhancement system cleans the background of a digital image prior to (or without) removing shadows. Accordingly, in one or more embodiments, the digital image enhancement system cleans the background without having access to a shadow removal image (i.e., the shadow removal image 410). Thus, in one or more embodiments, the digital image enhancement system utilizes an original digital image (e.g., the original digital image 102 or the digital image 300) or some other image rather than the shadow removal image 410.

In relation to the embodiment of FIG. 4B, however, the digital image enhancement system applies the blur filter 412 to the shadow removal image 410. In particular, in relation to FIG. 4B, the blur filter 412 comprises a median filter. Specifically, the blur filter 412 comprises a median filter that identifies a set of pixels (e.g., from the shadow removal image) within a window of a particular pixel (e.g., a particular of the shadow removal image) and replaces the particular pixel with the median of the set of pixels.

In one or more embodiments, the digital image enhancement system identifies the median for purposes of a median filter by rating the pixels according to a single channel (e.g., a luminosity or color channel). For example, the blur filter 412 identifies a median value by arranging a set of pixels according to luminosity (e.g., "L" or "Y") and then selecting the pixel that corresponds to the median luminosity. In other embodiments, the digital image enhancement system can identify the median by analyzing other values (e.g., L, a, and/or b values; R, G, and/or B values; Y, $C_b$, and/or $C_r$ values).

By applying the blur filter 412, the digital image enhancement system removes one or more foreground pixels. For example, with regard to localized text, the blur filter 412 will replace the values from the shadow removal image 410 identified foreground pixels with the median of surrounding pixels. Because text is often surrounded by background pixels, the blur filter 412 replaces the foreground pixels with background pixels.

In one or more embodiments, the digital image enhancement system also downsizes and upsizes an image in applying a blur filter. For example, in one or more embodiments, in applying the blur filter 412, the digital image enhancement system first downsizes the shadow removal image 410. The digital image enhancement system then applies the blur filter 412 and upsizes the resulting image to produce the blur bitmap 414. By downsizing and upsizing the shadow removal image 410, the digital image enhancement system can more efficiently remove foreground pixels from the shadow removal image 410.

In this manner, the digital enhancement system can generate the blur bitmap 414. The blur bitmap 414 reflects the shadow removal image 410 upon application of the blur filter 412, such that one or more foreground pixels have been removed. Because the blur bitmap 414 reflects removed foreground pixels, in one or more embodiments, the digital image enhancement system applies an inversion to the blur bitmap to generate a blur mask that approximates foreground pixels.

For example, with regard to FIG. 4B, the digital image enhancement system applies the inversion 416. The inversion 416 can comprise any algorithm that converts the blur bitmap 414 with foreground pixels removed into the blur mask 418 comprising an affirmative indication of foreground pixels. In relation to FIG. 4B, the inversion 416 comprises an algorithm that identifies the difference between the shadow removal image 410 and the blur bitmap 414 and applies an inversion filter to the difference.

In addition, in one or more embodiments, the digital image enhancement system generates a blur map that comprises a monochrome image. In order to generate a monochrome image, in one or more embodiments, the digital image enhancement system stretches resulting values from the inversion 416 across a range and then converts the stretched values to monochrome. Specifically, in relation to FIG. 4B, the digital image enhancement system stretches values resulting from the inversion 416 such that they range from 0 to 255. Thereafter, the digital image enhancement system applies a hysteresis binarization algorithm to generate the blur mask 418.

The resulting blur mask 418 is a monochrome image indicating foreground pixels based on application of a blur filter to the shadow removal image 410. Moreover, in one or more embodiments, as a result of applying a blur filter (and/or upsizing and downsizing a shadow removal image in applying a blur filter) the resulting blur mask identifies foreground pixels broadly (e.g., slightly over-estimates the foreground pixels).

As mentioned previously, upon generating an intermediate mask and a blur mask, the digital image enhancement system utilizes the intermediate mask and blur mask to generate a foreground mask. In particular, as mentioned previously, in one or more embodiments, the intermediate mask and blur mask tend to include a broad estimate of foreground pixels utilizing different approaches. Specifically, the intermediate mask can broaden a glyph mask and cleaning confidence map. Similarly, the blur mask can broaden foreground pixels in a shadow removal image. Accordingly, in one or more embodiments, the digital image enhancement system combines an intermediate mask and blur mask such that only pixels identified in both the intermediate mask and the blur mask are identified as foreground pixels in a resulting foreground mask.

For example, FIG. 4C illustrates combining the intermediate mask 408 and the blur mask 418 with an "and" operator 430 to generate a foreground mask 432. The "and" operator 430 compares corresponding pixels of the intermediate mask 408 and the blur mask 418. Specifically, if values of the intermediate mask 408 and the blur mask 418 each affirmatively indicate a foreground pixel (i.e., they both indicate a value of "1"), than the "and" operator 430 generates a foreground mask with an affirmative indication of foreground pixel (i.e., a value of "1"). Otherwise, the "and" operator generates a foreground mask with an indication of a background pixel (e.g., a value of "0").

For instance, as shown in FIG. 4C, the intermediate mask contains a first value 420*a* that is a 1. The blur mask 418 contains a corresponding second value 422*a* that is also a 1. Because the first value 420*a* "and" the second value 422*a* are each 1 (i.e., each value indicates a foreground pixel), the digital image enhancement system generates the foreground mask 432 with a corresponding third value 424*a* that is a 1.

In addition, the intermediate mask 408 contains a fourth value 420*b* that is a 1, with a corresponding fifth value 422*b* in the blur mask 418 that is a 0. Because the fourth value 420*b* and the fifth value 422*b* are not each 1 (i.e., one of the values does not indicate a foreground pixel), the digital image enhancement system generates the foreground mask 432 with a corresponding sixth value 424*b* that is a 0.

In this manner, the digital image enhancement system can generate the foreground mask 432. In addition, in one or more embodiments, the digital image enhancement system also applies a dilation filter in generating the foreground mask 432. As used herein, a "dilation filter" is a filter that expands objects portrayed in an image. In particular, a "dilation filter" includes a filter that expands binary images. For example, a dilation filter includes a filter that analyzes a set of pixels within a window surrounding a particular binary pixel and, if any of the surrounding pixels contain an affirmative pixel (e.g., a 1), replaces the binary pixel with an affirmative pixel (e.g., a 1).

Accordingly, in one or more embodiments, the digital image enhancement system applies a dilation filter in generating the foreground mask 432. In particular, experimenters have discovered that applying a dilation filter with a 3 pixel by 3 pixel window generates a foreground mask that produces better results.

The process of generating the foreground mask 432 can also be expressed in terms of an algorithm or a series of steps or equations. For example, in one or more embodiments, the digital image enhancement system utilizes the following high-level pseudocode to generate the foreground mask 432.

1. Take the single channel image representing a "Cleaning Confidence Map" and convert it to a monochrome image by any suitable method, such as hysteresis binarization.

2. Take the text glyph mask and construct a new monochrome image by applying the 'OR' operator on the text glyph mask and the image created in step 1 to generate the "intermediate mask."
3. Obtain a monochrome image from a shadow removal image, using the following steps. The output of these steps is the "Blur Mask."
   a. Downsize the input image by a factor $k_{blur}$.
   b. Run a suitable blur filter like the median filter to remove the foreground content. If a median filter is used, the ordering of the pixels during the median filter calculation could be done in many ways, such as based on their luminance values (e.g. Y in YCbCr or L in CIE-Lab color spaces respectively).
   c. Upsize the output of the last step by $k_{blur}$, to get an image of the original size. Call this BlurBitmap.
   d. Create the difference image between the input image (i.e., the shadow removal image) and BlurBitmap and then apply an inversion filter on the output.
   e. From the output of the last step, create a single channel version of the same using the luminance values for all the pixels (e.g. Y in $YC_bC_r$ or L in CIE-Lab).
   f. Apply histogram stretching on the single channel image we get from the last step, such that the lowest and highest luminance values in the image are 0 and 255 respectively. Any suitable method that achieves this can be used.
   g. Convert the single channel image obtained in the last step to a monochrome image by any suitable method such as hysteresis binarization.
4. Create a monochrome image by applying the 'AND' binary operation with the "Intermediate Mask" obtained in Step 2 as one operand and the "Blur Mask" obtained in Step 3 as the other operand.
5. On the monochrome image obtained in the previous step, apply a dilation filter, with an experimentally determined window size. The result of the dilation filter is the "Foreground Mask."

As mentioned previously, an intermediate mask, a blur mask, and a foreground mask can be expressed as monochrome images. For example, FIG. 4D illustrates image representations of the original digital image 102, an intermediate mask 440, a blur mask 442, and a foreground mask 444. Specifically, in relation to FIG. 4D, the digital image enhancement system utilizes the original digital image 102 to generate the intermediate mask 440 and the blur mask 442. Moreover, the digital image enhancement system utilizes the intermediate mask 440 and the blur mask 442 to generate the foreground mask 444.

As illustrated, both the intermediate mask 440 and the blur mask 442 slightly over-estimate foreground pixels. For example, the numbers represented in the top-right corner of blur mask 442 and the graphic in the top left corner of the blur mask 442 each over-estimate foreground pixels. Similarly, bottom right corner of the intermediate mask 440 over-estimates foreground pixels corresponding to a signature block. However, combining both the intermediate mask 440 and the blur mask 442 (i.e., utilizing an "and" operator) results in the foreground mask 444, which more accurately reflects foreground pixels in relation to the original digital image 102. In this manner, the digital image enhancement system can utilize a cleaning confidence map to segregate foreground pixels from background pixels according to one or more embodiments.

In addition to identifying a foreground mask, the digital image enhancement system can also isolate and clean background pixels. Indeed, as mentioned previously, in one or more embodiments, the digital image enhancement system cleans background pixels based on the color and/or luminosity of each background pixel. Specifically, in one or more embodiments, the digital image enhancement system cleans background pixels that are close to white less vigorously.

For example, FIG. 4E illustrates segregating and cleaning background pixels in accordance with one or more embodiments. In particular, FIG. 4E illustrates the shadow removal image 410 and the foreground mask 444. In one or more embodiments, the digital image enhancement system performs the step 450 of removing foreground mask pixels to generate a background image 452. In particular, in one or more embodiments, the digital image enhancement system removes the pixels identified as foreground pixels in the foreground mask 444 from the shadow removal image 410. The remaining pixels form the background image 452.

In addition, as shown in FIG. 4E, the digital image enhancement system can apply a cleaning factor 454 to the background image 452 to generate a background cleaned digital image 456. In one or more embodiments, the cleaning factor 454 comprises a factor for modifying luminosity of the pixels in the background image 452. For example, in one or more embodiments, the digital image enhancement system calculates the cleaning factor 454 with regard to each individual pixel of the background image 452, and modifies the luminosity of each individual pixel of the background image 452 based on the cleaning factor 454.

In one or more embodiments, the cleaning factor 454 is based on a distance in a color space between each individual pixel in the background image 452 and a white point in the color space. As used herein, the term "white point" refers to coordinates in a color space that define a white color. For example, the term "white point" includes the point (255, 255, 255) in an RGB color space.

Thus, in relation to FIG. 4E, the digital image enhancement system calculates the cleaning factor 454 based on a distance between each pixel in the background image 452 and a white point. For example, the further a pixel from the white point, the more the digital image enhancement system modifies luminosity of the pixel. Similarly, the closer a pixel to the white point, the more less the digital image enhancement system modifies the luminosity of the pixel.

In some circumstances, modifying luminosity of dark pixels can accidentally clean foreground pixels (e.g., if foreground pixels were erroneously classified as a background pixel). Accordingly, in one or more embodiments, the digital image enhancement system can apply thresholds to modify the extent that the digital image enhancement system modifies the digital image. For example, in some embodiments, if a pixel is a far distance from a white point (i.e., above an upper threshold), the digital image enhancement system will not modify the pixel. Moreover, if a pixel is very close to a white point (less than a lower threshold), the digital image enhancement system can replace the pixel with the white point. In addition, if a pixel is between an upper and lower threshold, the digital image enhancement system can increase the modifications as distance from the white point increases (i.e., lighten dark pixels more than light pixels) based on an upper threshold and a lower threshold.

In relation to FIG. 4E, the digital image enhancement system applies the cleaning factor 454. Specifically, the digital image enhancement system calculates the cleaning factor 454 specific to each pixel in the background image and then modifies the luminosity of each pixel in the background image 452 based on the cleaning factor and the distance between the pixel and a white space, subject to a lower and upper threshold.

In one or more embodiments, the lower and upper thresholds set the strength (or aggressiveness) of background cleaning. For example, a high lower threshold will result in more aggressive changes to luminosity in the background cleaning. Similarly, a higher upper threshold will result in more aggressive changes to luminosity in the background cleaning. In one or more embodiments, the digital image enhancement system allows a user to select the lower and/or upper thresholds to select a cleaning strength.

Moreover, in one or more embodiments, the digital image enhancement system selects the lower and/or upper thresholds. The digital image enhancement system can select lower and/or upper thresholds based on a variety of factors, such as luminosity of a digital iamge, color of a digital image, and/or glyphs in a digital image. For example, in one or more embodiments, the digital image enhancement system selects a reduced upper threshold based on a high number of glyphs in a digital image. Similarly, in one or more embodiments, the digital image enhancement system selects a reduced lower threshold based on a determination that a digital image contains a high number of bright pixels.

The process of generating the background cleaned digital image 456 can also be expressed in terms of an algorithm or a series of steps or equations. For example, in one or more embodiments, the digital image enhancement system utilizes the following high-level pseudocode to generate the background cleaned digital image 456.

1. Based on a user selected "cleaning strength," set the following thresholds, $t_{Lower}$ and $t_{Upper}$ (e.g., based on a set of values corresponding to each user selectable "cleaning strength").
2. For each pixel in the image, apply the following steps:
    a. If the pixel is a foreground pixel (i.e, it is present in the foreground mask), leave it alone, move to the next pixel.
    b. If the pixel is a not a foreground pixel, then it is part of the background. Determine the distance of the pixel from the white point. For the RGB color space, the white point is an (R, G, B) value of (255, 255, 255). Call the distance from the white point to the pixel, $d_W$, and it is the Euclidean distance of the pixel from the white point in the RGB color cube, as calculated by this formula:

$$d_W = \sqrt{(255-R)^2 + (255-G)^2 + (255-B)^2}$$

c. If $d_W <= t_{Lower}$, set the new RGB value of the pixel as the white point (255, 255, 255) and move to the next pixel.
    d. If $t_{Lower} < d_W < t_{Upper}$, convert the pixel from the RGB color space to the $YC_bC_r$ color space (or CIE-Lab color space), then set the luminosity channel value (e.g., Y channel value) of the pixel according to a new value as calculated by the formula below, leaving the other channel values as is.
    First calculate the cleaning factor:

$$\text{cleaningFactor} = \frac{t_{Upper} * \frac{d_W - t_{Lower}}{t_{Upper} - t_{Lower}}}{d_W}$$

Now, calculate the new L value:

$$L_{new} = 255 - ((255-L) * \text{cleaningFactor})$$

Convert the $L_{new}C_bC_r$ (or $L_{new}ab$) value back to RGB color and set the new value in the image.
    e. If $t_{Upper} <= d_W$, leave the pixel alone.

For example, FIG. 4F illustrates a background cleaning digital image 462 generated by utilizing the foregoing steps. In particular, FIG. 4F illustrates a shadow removal image 460 utilized to generate the background cleaned digital image 462. Notably, background pixels of the shadow removal image 460 have been cleaned so that background pixels are white and blemishes removed.

As mentioned previously, although many of the embodiments described in relation to FIGS. 4A-4F reference a shadow removal image (e.g., the shadow removal image 410), it will be appreciated that in one or more embodiments the digital image enhancement system can clean background pixels without generating a shadow removal image. For example, in one or more embodiments, the digital image enhancement system cleans background pixels before generating a shadow removal image. Accordingly, it will be appreciated that the steps described above in relation to a shadow removal image can also be conducted in relation to an original digital image or some other input digital image.

Figure 5A:
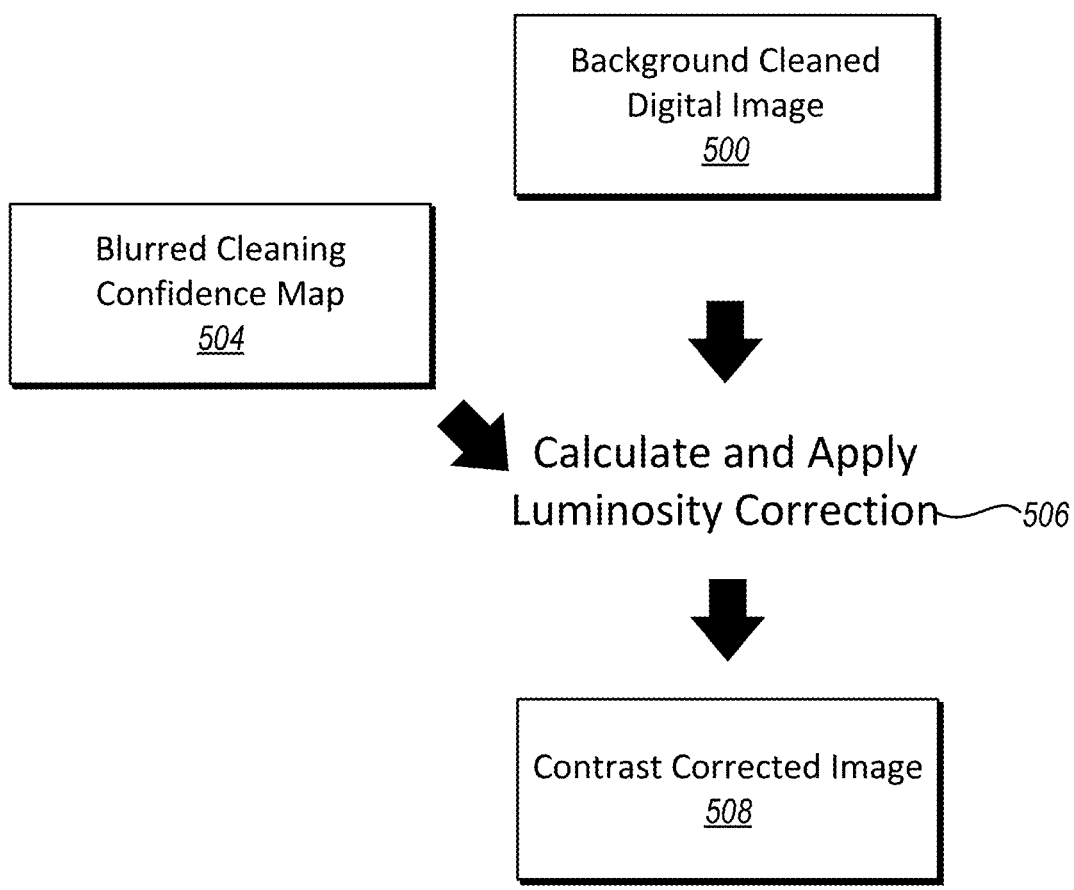
FIG. 5A illustrates correcting contrast of a digital image utilizing a cleaning confidence map in accordance with one or more embodiments.
Figure 5B:
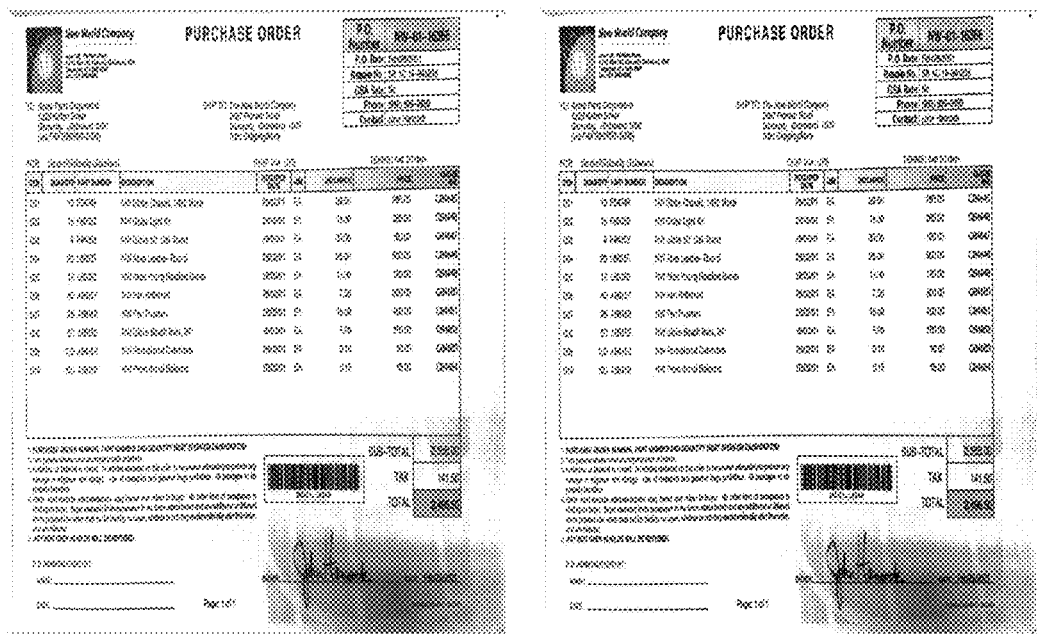
FIG. 5B illustrates a representation of an input image after background cleaning and a final digital image after contrast correction in accordance with one or more embodiments.

In addition to removing shadows and/or cleaning background pixels, as discussed previously, the digital image enhancement system can also correct contrast in relation to a digital image. In particular, the digital image enhancement system can modify contrast in a digital image to make text and/or graphics more distinguishable. Contrast correction can be accomplished in a number of ways utilizing a variety of contrast correction techniques or algorithms. Indeed, the digital image enhancement system can take the output of any contrast correction method and scale the result based on content. For instance, the digital image enhancement system can utilize output of a contrast correction algorithm and adjust how aggressive it applies the contrast correction based on cleaning confidence values of a cleaning confidence map. Accordingly, in one or more embodiments, the digital image enhancement system scales output of a contrast correction method (e.g., a histogram stretching approach) such that the higher the cleaning confidence value from the cleaning confidence map, the greater the contrast correction. In this manner, the digital image enhancement system can perform a contrast correction that is context aware (i.e., specific to the content of each pixel in the digital image). For example, FIGS. 5A-5B illustrate correcting contrast in a digital image utilizing a cleaning confidence map. In particular, FIG. 5A illustrates the digital image enhancement system utilizing a background cleaned digital image 500 together with a blurred cleaning confidence map 504 to perform a step 506 of calculating and applying a luminosity correction. Upon calculating and applying a luminosity correction, FIG. 5A illustrates that the digital image enhancement system generates a contrast corrected image 508.

It will be appreciated that the background cleaned digital image 500 can include any image where the digital image enhancement system has cleaned background pixels (e.g., the background cleaned digital image 456). Moreover, it will also be appreciated that in one or more embodiments the digital image enhancement system can utilize a digital image where the background has not been cleaned in the place of the background cleaned digital image 500. For example, in one or more embodiments, the digital image enhancement system applies a contrast correction on an original digital image (e.g., the original digital image 102) or a shadow removal image (e.g., the shadow removal image 322).

In relation to the embodiment of FIG. 5A, however, the digital image enhancement system utilizes the background cleaned digital image 500 to calculate a luminosity correction. As explained previously, the digital image enhancement system can utilize any contrast correction approach or algorithm to calculate a luminosity correction. For example, in one or more embodiments, the digital image enhancement system utilizes a histogram stretching technique. In particular, in relation to the embodiment of FIG. 5A, the digital image enhancement system calculates a histogram of luminosity from the background cleaned digital image 500. Specifically, the digital image enhancement system calculates a luminosity histogram that indicates a number (or percentage) of pixels in the background cleaned digital image 500 that correspond to particular luminosities (or ranges of luminosities). For example, the digital image enhancement system can generate a histogram of luminosity by calculating the number (or percentage) of pixels in the background cleaned digital image 500 that correspond to luminosities of 0, 1, 2, 3, . . . 253, 254, 255, respectively.

In addition, as shown in FIG. 5A, the digital image enhancement system also utilizes the blurred cleaning confidence map 504 to generate the contrast corrected image 508. The blurred cleaning confidence map 504 comprises a cleaning confidence map (e.g., the cleaning confidence map 230) corresponding to a digital image utilized to create the background cleaned digital image 500. Accordingly, the blurred cleaning confidence map 504 indicates how aggressively the digital image enhancement system will modify pixels in the background cleaned digital image 500 in correcting contrast.

In one or more embodiments, the digital image enhancement system generates the blurred cleaning confidence map 504 by applying a blur filter to an existing cleaning confidence map. For example, in one or more embodiments the digital image enhancement system applies an averaging filter to smooth sharp edges in the cleaning confidence values. Experimenters have determined that utilizing a blurred cleaning confidence map tends to lead to better results than using a raw cleaning confidence map.

As illustrated in FIG. 5A, the digital image enhancement system utilizes background cleaned digital image 500 (e.g., a histogram of luminosity from the background cleaned digital image 500) and the blurred cleaning confidence map 504 to calculate and apply a luminosity correction. In particular, in relation to the embodiment of FIG. 5A, the digital image enhancement system utilizes a histogram of luminosity to calculate a luminosity correction to stretch the luminosity values of the background cleaned digital image 500. Specifically, the digital image enhancement system identifies a maximum luminosity value and a minimum luminosity value from a histogram of luminosity and calculates a luminosity correction based on the maximum luminosity value and the minimum luminosity value.

For example, in one or more embodiments, the digital image enhancement system calculates a luminosity correction to stretch the luminosity values between the maximum luminosity value and the minimum luminosity value to a new range of luminosity. In particular, if the maximum luminosity value is 200 and the minimum luminosity value is 50, the digital image enhancement system can calculate a luminosity correction for each pixel to stretch the luminosity of the background cleaned digital image 500 from 0 to 255. By stretching the luminosity, the digital image enhancement system can increase the contrast (e.g., the distinction in luminosity) between pixels in the digital image.

The maximum and minimum luminosity values can comprise an absolute maximum and absolute minimum luminosity value from a luminosity histogram or another maximum and minimum luminosity value. For example, in one or more embodiments, the maximum and minimum luminosity values are calculated based on a certain percentage corresponding to a histogram of luminosity. For example, in one or more embodiments, the digital image enhancement system identifies the maximum luminosity value as the luminosity value that exceeds a certain percentage (or number) of all luminosity values in the histogram of luminosity (e.g., the luminosity value that is greater than 95% of the other luminosity values in the histogram of luminosity). Similarly, in one or more embodiments, the digital image enhancement system identifies the minimum luminosity value as the luminosity value that falls below a certain percentage (or number) of all luminosity values in the histogram of luminosity (e.g., the luminosity value that is less than 95% of other luminosity values in the histogram of luminosity). In this manner, one or more embodiments of the digital image enhancement system can remove outliers and more appropriately stretch the digital image enhancement system to correct contrast.

As articulated previously, the digital image enhancement system can use alternate contrast correction methods, of which histogram stretching is one exemplary method. Thus, although the immediately preceding embodiments describe utilizing histogram stretching to calculate a luminosity adjustment, the digital image enhancement system can utilize a luminosity adjustment generated by any contrast correction technique. For example, in addition to the histogram stretching approach outlined above, the digital image enhancement system can also utilize piecewise linear stretching, non-linear stretching (logarithmic, exponential, or power transformations), histogram equalization, histogram specification, or adaptive histogram modification techniques.

Moreover, as described above, in one or more embodiments, the digital image enhancement system utilizes a content aware approach to contrast correction. In particular, the digital image enhancement system adjusts contrast taking into account the content of each pixel in a digital image. Thus, as shown in FIG. 5A, the digital image enhancement system also utilizes the blurred cleaning confidence map 504 to correct contrast of the background cleaned digital image 500. In particular, the digital image enhancement system scales the luminosity correction for each pixel based on the cleaning confidence corresponding to each pixel. Specifically, the higher the confidence value (e.g., the more confident that a pixel does not portray a graphic or a glyph), the greater the luminosity correction. Similarly, the lower the confidence value, the smaller the luminosity correction. Accordingly, utilizing the blurred cleaning confidence map 504 and the histogram of luminosity 502 the digital image enhancement system can calculate a scaled (i.e., modified) luminosity correction that modifies contrast based on pixel content.

Upon calculating a scaled luminosity correction, the digital image enhancement system can then modify the luminosity of each pixel in the background cleaned digital image 500 based on the scaled luminosity correction to generate the contrast corrected image 508. In this manner, the digital image enhancement system can perform a content aware contrast correction utilizing a cleaning confidence map.

The process of generating the contrast corrected image 508 can also be expressed in terms of an algorithm or a series of steps or equations. For example, in one or more embodiments, the digital image enhancement system utilizes the following high-level pseudocode to generate the contrast corrected image 508.
1. Create a histogram of luminosity channel values (e.g., Y channel values in $YC_bC_r$ color space or L values in CIE-Lab color space) for all pixels in the image. Find the values $L_{min}$ and $L_{max}$ for stretching the histogram, such that only a small percentage of pixels are below and above these limits respectively.
2. For each pixel in the image, do the following procedure:
   a. Get the luminosity channel value, $L_{orig}$ (e.g., the "Y" channel value or the "L" channel value) of the pixel and the value of the cleaning confidence for the pixel, confidence (i.e., value from the corresponding pixel in the cleaning confidence map).
   b. Calculate $L_{new}$ from $L_{orig}$ using the following stretching formula:

$$L_{new} = \left(\frac{L_{orig} - L_{min}}{L_{max} - L_{min}}\right) * 255$$

c. Calculate an $L_{adj}$ value (i.e., luminosity correction) using the following formula:

$$L_{adj} = L_{orig} - L_{new}$$

d. Calculate an $L_{adj\text{-}scaled}$ value (i.e., scaled or modified luminosity correction) using the following formula:

$$L_{adj\text{-}scaled} = k_{contrast} * (L_{adj}) * \left(\frac{confidence}{255}\right)$$

where $k_{contrast}$ is an a constant that can be modified to adjust the change in luminosity.
   e. Calculate $L_{final}$ using this formula:

$$L_{final} = L_{orig} + L_{adj\text{-}scaled}$$

f. Set the luminosity channel value (e.g., "Y" channel value or "L" channel value) of the pixel as $L_{final}$, leaving the other channels ($C_b$ and $C_r$; or a and b) unchanged.

The result of these steps is a final cleaned image after contrast correction. An illustrative example of such an image is provided in relation to FIG. 5B. In particular, FIG. 5B illustrates representations of a background cleaned digital image 510 and a final digital image after contrast correction 512 (i.e., the final digital image 110).

Figure 6:
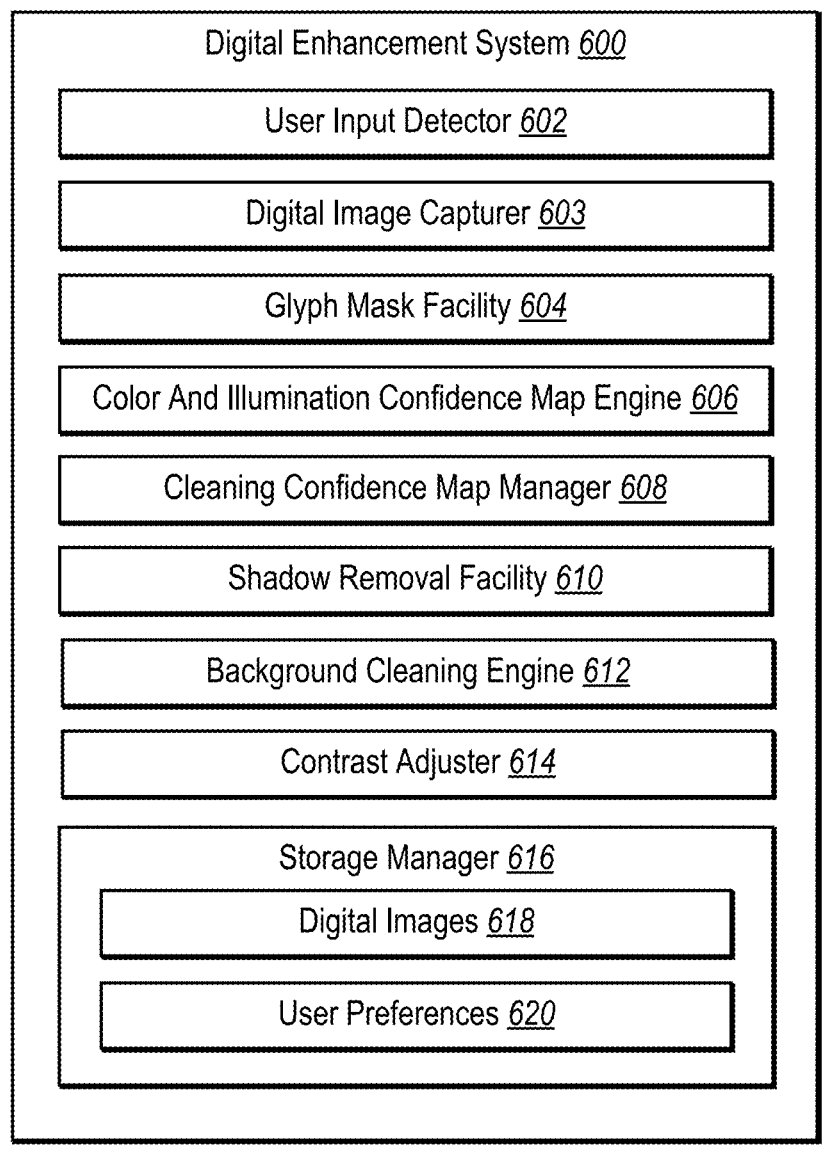
FIG. 6 illustrates a schematic diagram of a digital enhancement system in accordance with one or more embodiments.

Turning now to FIG. 6, additional detail is provided regarding components and capabilities of one embodiment of the digital image enhancement system. In particular, FIG. 6 illustrates an embodiment of an exemplary digital enhancement system 600 (e.g., the digital image enhancement system described above). As shown, the digital enhancement system 600 may include, but is not limited to a user input detector 602, a digital image capturer 603, a glyph mask facility 604, a color and illumination confidence map engine 606 (also referred to herein as the "CIC map engine 606"), a cleaning confidence map manager 608, a shadow removal facility 610, a background cleaning engine 612, a contrast adjuster 614, and a storage manager 616 (comprising digital images 618 and user preferences 620).

As just mentioned, and as illustrated in FIG. 6, the digital enhancement system 600 includes the user input detector 602. The user input detector 602 detects, identifies, monitors, receives, processes, captures, and/or records various types of user input. For example, the user input detector 602 detects one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 602 operates in conjunction with any number of user input devices or computing devices (in isolation or in combination). The user input detector 602 detects and identifies various types of user interactions with user input devices, such as select events, drag events, scroll events, release events, and so forth. For example, in the event a client device corresponding to the digital enhancement system 600 includes a touch screen, the user input detector 602 detects one or more touch gestures. Moreover, the user input detector 602 communicates with, and thus detects user input with respect to a variety of programs, applications, plug-ins, operating systems, user interfaces, or other implementations in software or hardware.

In addition, the user input detector 602 can receive user input of a variety of configurable variables in relation to the digital enhancement system 600. For example, as described above, the user input detector 602 can receive user input of a color glyph confidence value (e.g., $v_{cc}$-color); a grayscale glyph confidence value (e.g., $v_{cc}$-gray); high-filter window size (e.g., size of the window 306); percentile applicable to a high-level filter (e.g., percentile utilized by the filter subject to the floor value 308); luminosity floor threshold (e.g., the floor value utilized by the filter subject to the floor value 308); lower distance threshold (e.g., $t_{lower}$); upper distance threshold (e.g., $t_{upper}$); blur filter window size (e.g., $w_{avg}$); $k_{win}$; $k_{shadow}$; $k_{blur}$; and/or $k_{contrast}$.

As illustrated in FIG. 6, in addition to the user input detector 602, the digital enhancement system 600 also includes the glyph mask facility 604. The glyph mask facility 604 can generate, create, calculate, provide, or identify one or more glyph masks. In particular, the glyph mask facility 604 can determine pixels in a digital image corresponding to one or more glyphs (e.g., utilizing an EBAB algorithm or optical character recognition algorithm). For example, as described above, the glyph mask facility 604 can generate a glyph mask that comprises a monochrome digital image that identifies pixels in a digital image that correspond to text in a document portrayed in a digital image.

In addition to the glyph mask facility 604, as illustrated in FIG. 6, the digital image enhancement system 600 also includes the digital image capturer 603. The digital image capturer 603 can capture, take, receive, gather, and/or identify one or more digital images. In particular, the digital image capturer 603 can capture a digital image portraying a document (e.g., a physical document with glyphs and/or graphics). For example, the digital image capturer 603 can comprise a mobile device, a digital camera, and/or a smartphone operatively coupled to a digital camera.

As shown in FIG. 6, the digital enhancement system 600 can also include the CIC map engine 606. The CIC map engine 606 can generate, create, calculate, provide, or identify one or more color and illumination confidence maps. In particular, as described above, the CIC map engine 606 can generate a color and illumination confidence map from color and luminosity values of a digital image that reflect the extent of color and luminosity in each pixel in a digital image. For example, the CIC map engine 606 can generate a color confidence map (e.g., the confidence AB map 220) and/or a luminosity confidence map (e.g., the confidence L map 222). As described previously, the CIC map engine 606 can combine a color confidence values from a color confidence map and luminosity confidence values from a luminosity confidence map to generate a color and illumination confidence map.

As shown in FIG. 6, the digital enhancement system 600 also includes the cleaning confidence map manager 608. The cleaning confidence map manager 608 can generate, create, calculate, or identify a cleaning confidence map. In particular, the cleaning confidence map manager 608 can generate a cleaning confidence map based on a glyph mask (from the glyph mask facility 604) and color and illumination color map (e.g., from the CIC map engine 606). For example, the cleaning confidence map manager 608 can generate a cleaning confidence map that reflects how aggressively to clean one or more pixels of a digital image based on color and luminosity of pixels in the digital image and whether the pixels correspond to one or more glyphs.

As illustrated in FIG. 6, the digital enhancement system 600 also includes the shadow removal facility 610. The shadow removal facility 610 can remove one or more shadows from a digital image. In particular, the shadow removal facility 610 can modify (e.g., modify luminosity of) one or more pixels corresponding to a shadow. For example, as described above, in one or more embodiments, the shadow removal facility 610 utilizes a cleaning confidence map (e.g., from the cleaning confidence map manager 608) to modify luminosity of pixels corresponding to a shadow. More specifically, the shadow removal facility 610 can generate a modified local luminance map that indicates pixels corresponding to one or more shadows. Moreover, as described previously, the shadow removal facility 610 can and utilize the modified local luminance map in conjunction with a cleaning confidence map to modify luminosity of pixels corresponding to shadows based on pixel content.

In addition, as illustrated in FIG. 6, the digital enhancement system 600 also includes the background cleaning engine 612. The background cleaning engine 612 can modify, clean, adjust, and/or brighten background pixels in a digital image. In particular, the background cleaning engine 612 can segregate foreground pixels (i.e., graphics and glyphs) from background pixels in a digital image and modify the background pixels (e.g., to remove a hue and/or blemishes and make the background pixels more white). As discussed above, the background cleaning engine 612 can utilize a cleaning confidence map (e.g., from the cleaning confidence map manager 608) to generate a foreground mask, separate background pixels from foreground pixels, and clean the background pixels.

As shown in FIG. 6, in addition to the background cleaning engine 612, the digital enhancement system 600 also includes the contrast adjuster 614. The contrast adjuster 614 can modify, adjust, and/or brighten one or more pixels to adjust contrast between pixels in a digital image. In particular, in one or more embodiments, the contrast adjuster 614 can stretch a luminosity channel corresponding to a digital image (e.g., utilizing histogram stretching). In addition the contrast adjuster 614 can stretch the luminosity channel based on pixel content by utilizing a cleaning confidence map. For example, as described previously, the contrast adjuster 614 can calculate a luminosity correction based on maximum and minimum values of a histogram of luminosity and modify the luminosity correction based on the cleaning confidence map.

As shown in FIG. 6, the digital enhancement system 600 also includes the storage manager 616. The storage manager 616 maintains data as necessary to perform the functions of the digital enhancement system 600. As illustrated, the storage manager 616 includes digital images 618. Digital images 618 include any digital image captured, utilized, or generated by the digital enhancement system 600. For example, digital images 618 include original digital images portraying a document captured with a mobile device. Similarly, digital images 618 include glyph masks (e.g., a monochrome glyph mask), color and illumination confidence maps (e.g., a grayscale color and illumination confidence map), cleaning confidence maps (e.g., a grayscale cleaning confidence map or blurred cleaning confidence map), modified local luminance maps (e.g., a monochrome local luminance map), a shadow removal image (e.g., a bitmap shadow removal image), an intermediate mask (e.g., a monochrome intermediate mask), a blur mask (e.g., a monochrome blur mask), a foreground mask (e.g., a monochrome foreground mask), a background cleaned image (e.g., a bitmap background cleaned image), or a final image after contrast correction (e.g., a bitmap final digital image).

In addition, the storage manager 616 also includes user preferences 620. The user preferences 620 include selections, history, and preferences of one or more users of the digital enhancement system 600. For example user preferences 620 include selections of one or more configurable thresholds utilized by the digital enhancement system 600.

Each of the components 602-616 of the digital enhancement system 600 and their corresponding elements (as shown in FIG. 6) may be in communication with one another using any suitable communication technologies. It will be recognized that although components 602-616 of the digital enhancement system 600 and their corresponding elements are shown to be separate in FIG. 6, any of components 602-616 and their corresponding elements may be combined into fewer components, such as into a single facility or module, divided into more components, or configured into different components as may serve a particular embodiment.

The components 602-616 of the digital enhancement system 600 and their corresponding elements can comprise software, hardware, or both. For example, the components 602-616 and their corresponding elements can comprise one or more instructions stored on a computer-readable storage medium and executable by processors of one or more computing devices. When executed by the one or more processors, the computer-executable instructions of the digital enhancement system 600 can cause a client device and/or a server device to perform the methods described herein. Alternatively, the components 602-616 and their corresponding elements can comprise hardware, such as a special purpose processing device to perform a certain function or group of functions. Additionally, the components 602-616 and their corresponding elements can comprise a combination of computer-executable instructions and hardware.

Furthermore, the components 602-616 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-616 may be implemented as a stand-alone application, such as a desktop or mobile application. Furthermore, the components 602-616 may be implemented as one or more web-based applications hosted on a remote server. Alternatively or additionally, the components 602-616 may be implemented in a suit of mobile device applications or "apps." To illustrate, the components 602-616 may be implemented in an application, including but not limited to ADOBE® LIGHTROOM® software, ADOBE®

PHOTOSHOP® software, or ADOBE® CREATIVE® CLOUD® software. "ADOBE," "LIGHTROOM," "PHOTOSHOP," and "CREATIVE CLOUD" are either registered trademarks or trademarks of Adobe Systems Incorporated in the United States and/or other countries.

Figure 7:
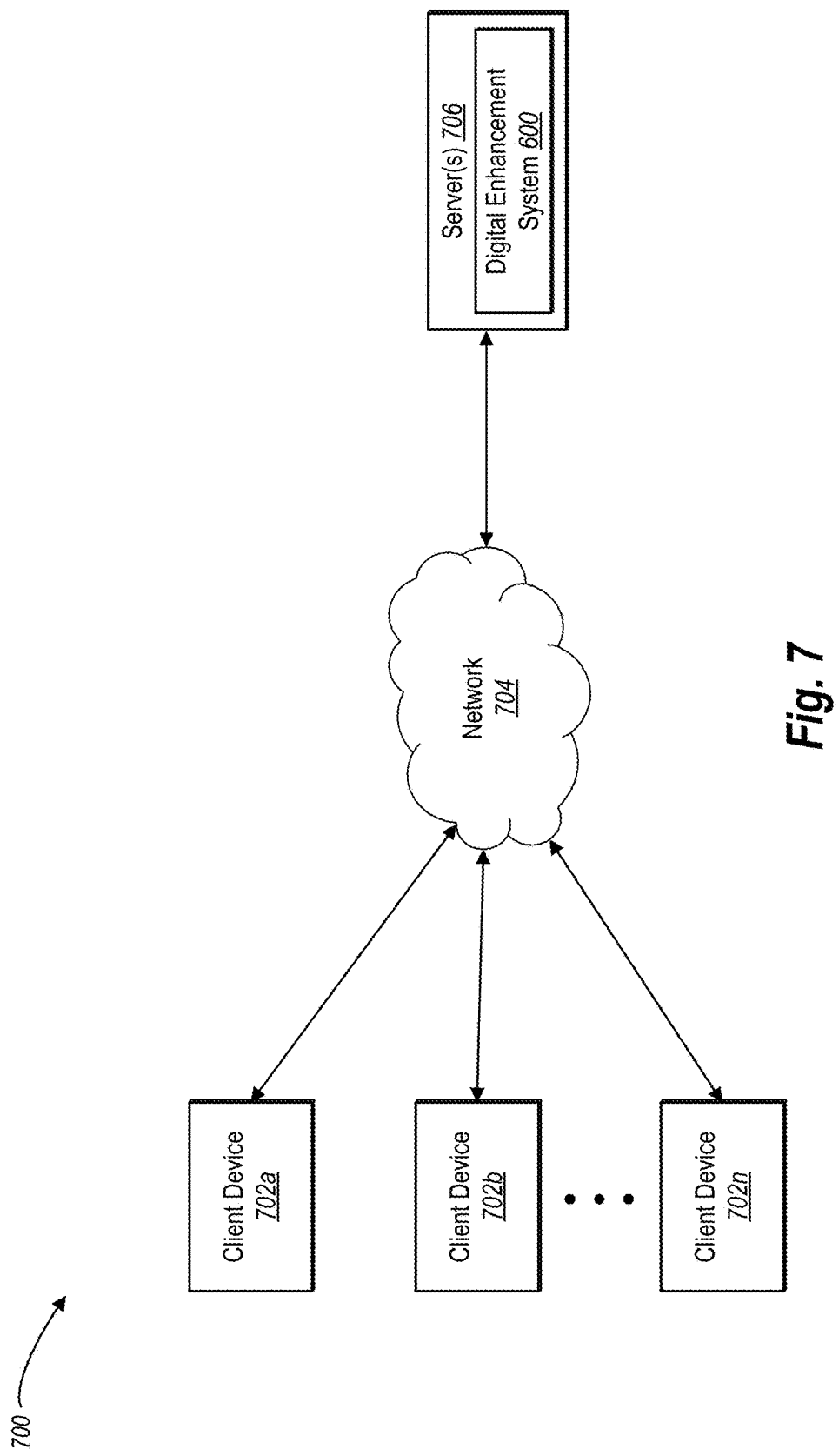
FIG. 7 illustrates a schematic diagram of an exemplary environment in which the digital enhancement system can operate in accordance with one or more embodiments.

FIG. 7 illustrates a schematic diagram of one embodiment of an exemplary environment 700 in which the digital enhancement system 600 can operate. In one or more embodiments, the exemplary environment 700 includes one or more client devices 702a, 702b, ... 702n, a network 704, and server(s) 706. The network 704 may be any suitable network over which the computing devices can communicate. Example networks are discussed in more detail below with regard to FIG. 10.

As illustrated in FIG. 7, the environment 700 may include client devices 702a-702n. The client devices 702a-702n may comprise any computing device. For instance, in one or more embodiments, one or more of the client devices 702a-702n comprise any computing device described below in relation to FIG. 10.

In addition, the environment 700 may also include the server(s) 706. The server(s) 706 may generate, store, receive, and transmit any type of data, including digital images 618 and/or user preferences 620. For example, the server(s) 706 may transmit data to a client device, such as the client device 702a. The server(s) 706 can also transmit electronic messages between one or more users of the environment 700. In one example embodiment, the server(s) 706 comprise a content server. The server(s) 706 can also comprise a communication server or a web-hosting server. Additional details regarding the server(s) 706 will be discussed below with respect to FIG. 10.

As illustrated, in one or more embodiments, the server(s) 706 can include the digital enhancement system 600. In particular, the digital enhancement system 600 can comprise an application running on the server(s) 706 or a portion of a software application that can be downloaded from the server(s) 706. For example, the digital enhancement system 600 can include a web hosting application that allows the client devices 702a-702n to interact with content hosted at the server(s) 706. To illustrate, in one or more embodiments of the exemplary environment 700, one or more client devices 702a-702n can access a webpage supported by the server(s) 706. In particular, the client device 702a can run a web application (e.g., a web browser) to allow a user to access, view, and/or interact with a webpage or website hosted at the server(s) 706.

Although FIG. 7 illustrates a particular arrangement of the client devices 702a-702n, the network 704, and the server(s) 706, various additional arrangements are possible. For example, while FIG. 7 illustrates multiple separate client devices 702a-702n communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the digital enhancement system 600 can be implemented on a single computing device. In particular, the digital enhancement system 600 may be implemented in whole by the client device 702a or the digital enhancement system 600 may be implemented in whole by the server(s) 706. Alternatively, the digital enhancement system 600 may be implemented across multiple devices or components (e.g., utilizing the client devices 702a-702n and the server(s) 706).

By way of example, in one or more embodiments, the client device 702a comprises a mobile device (e.g., a smartphone) operatively coupled to a digital camera. The client device 702a captures a digital image of a document comprising text and graphics (e.g., via the digital image capturer 603). The client device sends the digital image to the server(s) 706. Moreover, the server(s) 706 (and/or the client device 702a) analyze the digital image and generate a cleaning confidence map (e.g., utilizing the glyph mask facility 604, the CIC map engine 606, and the cleaning confidence map manager 608). Moreover, the server(s) 706 (and/or the client device 702a) utilize the cleaning confidence map to remove shadows (e.g., via the shadow removal facility 610), clean background pixels (e.g., via the background cleaning engine 612), and correct contrast of the captured digital image (e.g., via the contrast adjuster 614). The client device 702a can then provide the modified final digital image for display.

Moreover, the client device 702a can receive user input (e.g., via the user input detector 602) of one or more modified parameters (e.g., configurable variables described above). The client device 702a (and/or the server(s) 706) can iteratively generate a modified cleaning confidence map, remove shadows, clean background pixels, and/or correct contrast based on the one or more modified parameters.

In one or more embodiments, the server(s) 706 can maintain and gather information with regard to digital images and user preferences corresponding to a plurality of users. For example, the server(s) 706 can maintain digital images captured by a plurality of users and associated with a plurality of accounts. In one or more embodiments, the server(s) 706 can utilize information from a first account to modify digital images with regard to a second account. For example, the server(s) 706 can determine that users prefer particular settings with regard to one or more configurable variables based on user preferences of the client devices 702a and 702b. The server(s) 706 can modify a digital image from the client device 702n based on the detected settings of the client devices 702a and 702b.

Figure 8:
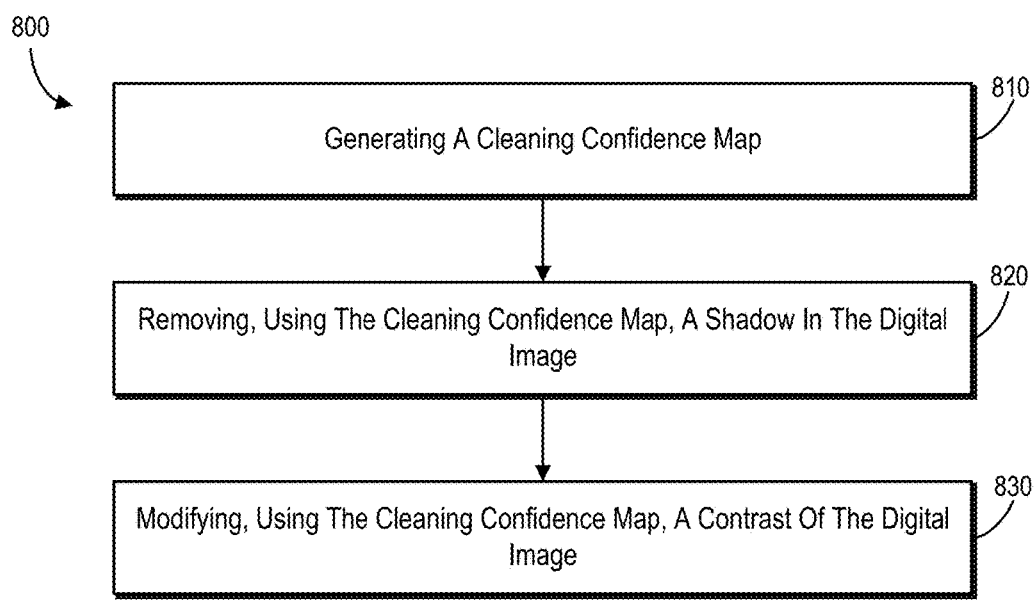
FIG. 8 illustrates a flowchart of a series of acts in a method of enhancing digital images in accordance with one or more embodiments.
Figure 9:
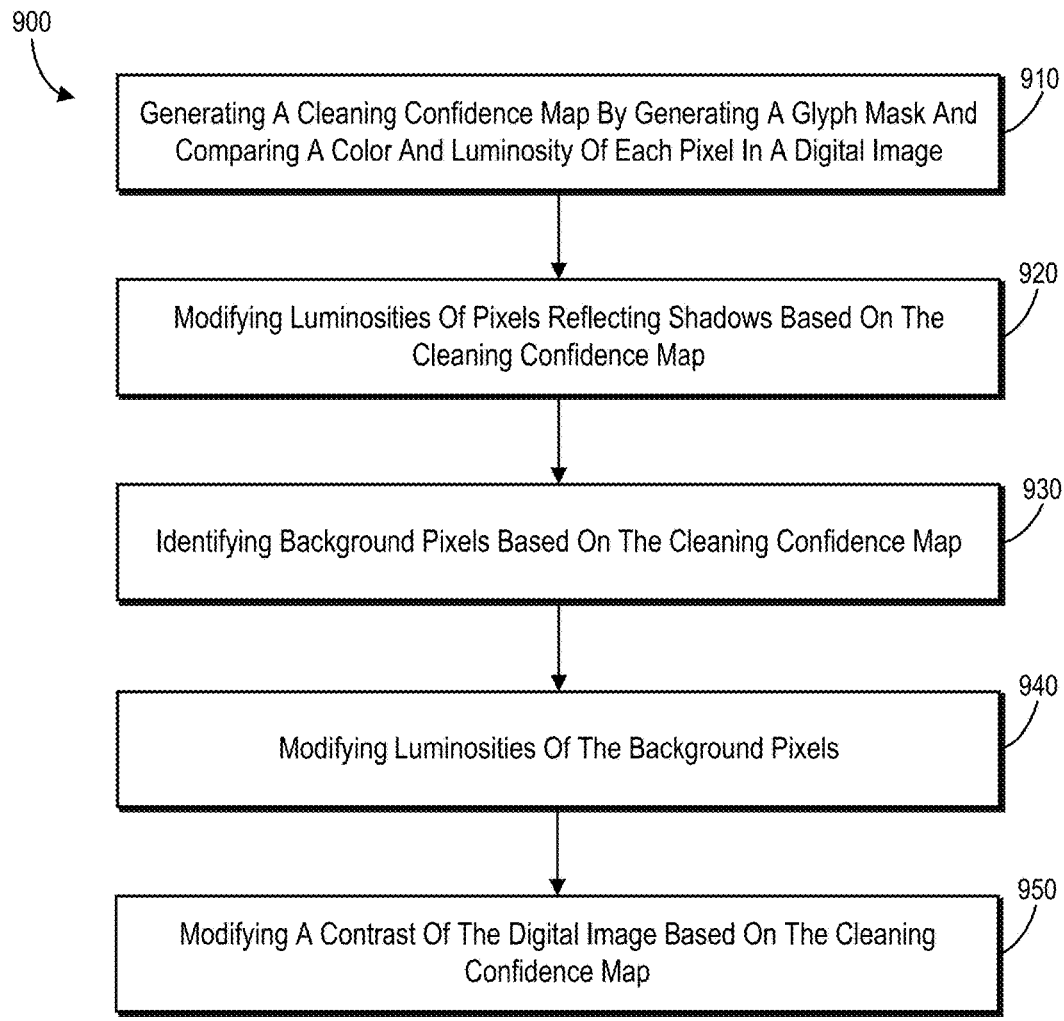
FIG. 9 illustrates a flowchart of a series of acts in another method of enhancing digital images in accordance with one or more embodiments.

FIGS. 1A-7, the corresponding text, and the examples, provide a number of different systems and devices that generate geo-tags for digital images. In addition to the foregoing, embodiments can also be described in terms of flowcharts comprising acts and steps in a method for accomplishing a particular result. For example, FIGS. 8-9 illustrate flowcharts of exemplary methods in accordance with one or more embodiments. The methods described in relation to FIGS. 8-9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of enhancing digital images portraying a document in accordance with one or more embodiments. In one or more embodiments, the method 800 is performed in a digital medium environment that includes the digital enhancement system 600. The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of generating a cleaning confidence map. In particular, the act 810 includes generating, by at least one processor, a cleaning confidence map comprising a plurality of cleaning confidence values corresponding to a plurality of pixels of a digital image, wherein each cleaning confidence value is generated based on a color and a luminosity of a corresponding pixel from the plurality of pixels and based on a determination of whether the corresponding pixel portrays a glyph in the digital image. For example, in one or more embodiments, the act 810 includes generating a glyph mask for the digital image, wherein the glyph mask identifies whether each pixel in the plurality of pixels portrays text. Furthermore, the act 810 can also involve generating a color confidence map for the digital image by converting a color of each pixel of the plurality of pixels into a color confidence value, wherein the color confidence value identifies the extent of the color corresponding to the first pixel; and generating a luminance confidence map for the digital image by converting a luminosity of each of the plurality of pixels into a luminance confidence value, wherein the luminance confidence value identifies the extent of the luminosity corresponding to the pixel.

In addition, in one or more embodiments, the act 810 includes utilizing the glyph mask, the color confidence map, and the luminance confidence map to generate the cleaning confidence map. For instance, in one or more embodiments, utilizing the glyph mask, the color confidence map, and the luminance confidence map to generate the cleaning confidence map further comprises, for each of the plurality of pixels: determining, from the glyph mask, whether the first pixel portrays text; if the pixel portrays text, setting a cleaning confidence value corresponding to the pixel to a glyph confidence value; and if the pixel does not portray text, comparing the color confidence value and the luminance confidence value corresponding to the pixel and setting the confidence value to one of either the color confidence value or the luminance value based on the comparison.

Indeed, as described above, in one or more embodiments, the glyph confidence value comprises at least one of a grayscale glyph confidence value or a color glyph confidence value. Moreover, the act 810 can further include determining whether the pixel corresponds to a color glyph based on the corresponding color confidence value; if the pixel corresponds to a color glyph, utilizing the color glyph confidence value; and if the pixel does not correspond to a color glyph, utilizing the grayscale glyph confidence value.

In addition, as illustrated in FIG. 8, the method 800 also includes an act 820 of removing, using the cleaning confidence map, a shadow in the digital image. In particular, the act 820 can include removing, using the cleaning confidence map, a shadow represented by one or more pixels in the digital image by adjusting a luminosity of each of the one or more pixels representing the shadow based on a luminosities of pixels surrounding the pixel and a cleaning confidence value corresponding to the pixel.

For example, in one or more embodiments, the act 820 involves generating a modified local luminance map for the plurality of pixels by: comparing a luminosity of each pixel in the plurality of pixels to luminosities of a set of pixels surrounding the pixel; filtering the set of pixels to remove an outlier luminosity from the set of pixels based on the highest luminosity in the set of pixels; and replacing the luminosity of the pixel with the luminosity of the highest remaining luminosity from the set of pixels, upon filtering the set of pixels.

In addition, the act 820 can also include generating a modified local luminance map by: comparing a luminosity of each pixel in the plurality of pixels to luminosities of a set of pixels surrounding the pixel; comparing a highest luminosity from the set of pixels to a luminosity floor threshold; and based on a determination that the luminosity from the set of pixels is below the luminosity floor threshold, replacing the luminosity of the pixel with the luminosity floor threshold.

Furthermore, in one or more embodiments, the act 820 includes modifying the luminosity of each of the one or more pixels based on the modified local luminance map and the cleaning confidence map. As described above, the act 820 can also include applying a blur filter to the cleaning confidence map prior to removing the shadow using the cleaning confidence map.

As shown in FIG. 8 the method 800 also includes an act 830 of modifying, using the cleaning confidence map, a contrast of the digital image. In particular, the act 830 can include modifying, using the cleaning confidence map, a contrast of the digital image by modifying a luminosity of each pixel in the plurality of pixels based on a maximum luminance value of the digital image, a minimum luminance value of the digital image, and a cleaning confidence value of the cleaning confidence map corresponding to the pixel.

In addition, FIG. 9 illustrates another flowchart of a series of acts in a method 900 of enhancing digital images in accordance with one or more embodiments. As shown, the method 900 includes an act 910 of generating a cleaning confidence map by generating a glyph mask and comparing a color and luminosity of each pixel in a digital image. In particular, the act 910 can include generating, by at least one processor, a cleaning confidence map comprising a plurality of cleaning confidence values corresponding to a plurality of pixels of a digital image, by: generating a glyph mask, the glyph mask indicating whether each pixel of the plurality of pixels portrays text in the digital image; comparing a color associated with each pixel from the plurality of pixels with a luminosity associated with the pixel; and selecting a cleaning confidence value for each pixel from the plurality of pixels based on the glyph mask and the comparison of the color and the luminosity corresponding to the pixel.

In addition, in one or more embodiments, the act 910 can also include generating a cleaning confidence map having a plurality of confidence values corresponding to a plurality of pixels of digital image based on luminosities and colors of the plurality of pixels, each cleaning confidence value indicating a likelihood that a corresponding pixel in the plurality of pixels is part of text or a graphic represented in the digital image.

Moreover, as shown in FIG. 9, the method 900 also includes an act 920 of modifying luminosities of pixels reflecting shadows based on the cleaning confidence map. In particular, the act 920 can include modifying luminosities of pixels reflecting shadows in the digital image based on the cleaning confidence map.

For example, in one or more embodiments, the act 920 can include removing a shadow reflected by one or more pixels in the digital image by adjusting a luminosity of each pixel in the one or more pixels based on luminosities of pixels surrounding the pixel and based on the likelihood that the first pixel is part of text or a graphic in the digital image, as indicated by the cleaning confidence map. In addition, in one or more embodiments, the act 920 involves generating a shadow removal image by adjusting the luminosity of each pixel in the plurality of pixels based on luminosities of a set of pixels surrounding the pixel after application of a high-value filter to the luminosities of the set of pixels and based on the cleaning confidence map As illustrated in FIG. 9, the method 900 also includes an act 930 of identifying background pixels based on the cleaning confidence map. In particular, the act 930 can include identifying background pixels of the digital image based on the cleaning confidence map. For example, in one or more embodiments, the act 930 includes segregating the plurality of pixels into foreground pixels and background pixels based on the likelihood that each pixel in the plurality of pixels is part of text or a graphic, as indicated by the cleaning confidence map, such that pixels from the plurality of pixels corresponding to text or a graphic are classified as foreground pixels. Thus, the act 930 can include segregating the plurality of pixels into foreground pixels and background pixels based on the cleaning confidence map and the glyph mask.

In one or more embodiments, the act 930 also includes generating a foreground mask. For example, the act 930 can involve generating a foreground mask comprising the foreground pixels by: generating an intermediate mask by combining the cleaning confidence map and the glyph mask; generating a blur mask from the shadow removal image by applying a blur filter to the shadow removal image; and combining the blur mask and the intermediate mask to generate the foreground mask.

As shown in FIG. 9, the method 900 also includes an act 940 of modifying luminosities of the background pixels. In particular, the act 940 can include adjusting the luminosity of the background pixels segregated based on the likelihood that each pixel in the plurality of pixels is part of text or a graphic. For example, in one or more embodiments, the act 940 includes modifying the luminosity of the background pixels based on a distance of each of the background pixels from a white point in a color space such that the larger the distance from the white point in the color space to the first pixel, the greater the modification.

In addition, as illustrated in FIG. 9, the method 900 also includes an act 950 of modifying a contrast of the digital image based on the cleaning confidence map. In particular, the act 920 can include modifying a contrast of the digital image by adjusting luminosities of the plurality of pixels based on the cleaning confidence map. For example, in one or more embodiments the act 950 includes calculating a histogram of luminosity from the luminosities of the plurality of pixels; calculating a luminosity correction for each pixel in the plurality of pixels based on the histogram; and modifying the luminosity correction for each pixel based on the cleaning confidence map, such that the luminosity correction for each pixel corresponds to the cleaning confidence value corresponding to the pixel.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
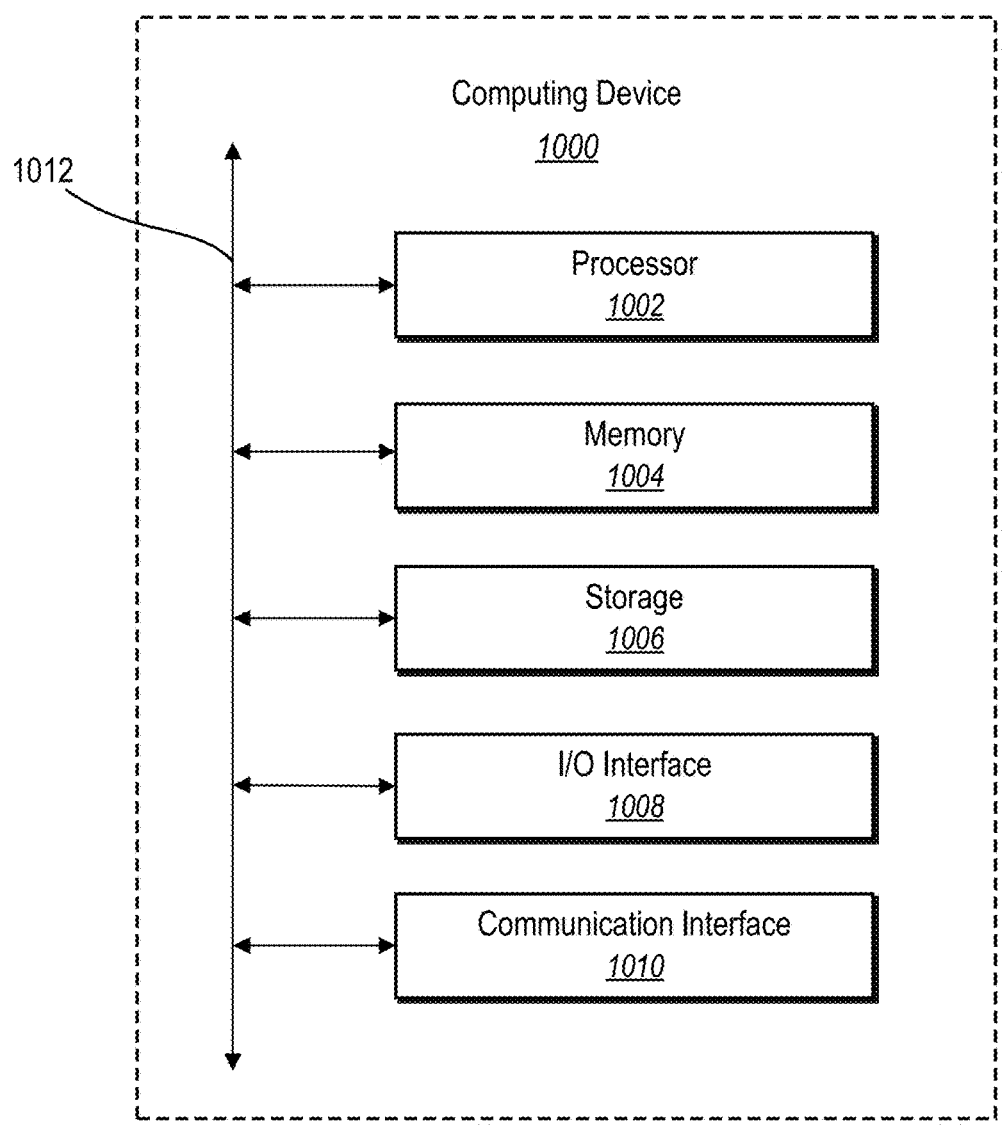
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital enhancement system 600 can comprise implementations of the computing device 1000. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for editing digital images, a method of enhancing digital images by modifying illumination of pixels based on pixel content, comprising:
   generating, by at least one processor, a cleaning confidence map comprising a plurality of cleaning confidence values corresponding to a plurality of pixels of a digital image by:
   determining whether a first pixel portrays a glyph in the digital image;
   comparing a color value of the first pixel and a luminance value of the first pixel to generate a color and illumination confidence value of the first pixel; and
   generating a first cleaning confidence value of the cleaning confidence map corresponding to the first pixel based on the determination of whether the first pixel portrays a glyph in the digital image and based on the color and illumination confidence value;

removing, using the cleaning confidence map, a shadow represented by one or more pixels in the digital image by adjusting a luminosity of each of the one or more pixels representing the shadow based on luminosities of pixels surrounding the one or more pixels and a cleaning confidence value corresponding to the one or more pixels; and modifying, using the cleaning confidence map, a contrast of the digital image by modifying a luminosity the plurality of pixels based on a maximum luminance value of the digital image, a minimum luminance value of the digital image, and the cleaning confidence values of the cleaning confidence map corresponding to the pixels of the plurality of pixels.

2. The method of claim 1, wherein generating the cleaning confidence map further comprises: generating a glyph mask for the digital image, wherein the glyph mask identifies whether each pixel in the plurality of pixels portrays text.

3. The method of claim 2, wherein generating the cleaning confidence map further comprises:

generating a color confidence map for the digital image by converting a color of each pixel of the plurality of pixels into a color confidence value, wherein the color confidence value identifies an extent that a color of a given pixel corresponds to a low-color; and generating a luminance confidence map for the digital image by converting a luminosity of each pixel of the plurality of pixels into a luminosity confidence value, wherein the luminosity confidence value identifies an extent that a luminosity of a given pixel corresponds to a high luminosity.

4. The method of claim 3, wherein generating the cleaning confidence map further comprises: utilizing the glyph mask, the color confidence map, and the luminosity confidence map to generate the cleaning confidence map.

5. The method of claim 4, wherein utilizing the glyph mask, the color confidence map, and the luminosity confidence map to generate the cleaning confidence map further comprises, for each of the plurality of pixels:

determining, from the glyph mask, whether a pixel portrays text;

if the pixel portrays text, setting a cleaning confidence value corresponding to the pixel to a glyph confidence value; and if the one or more pixels does not portray text, comparing the color confidence value and the luminosity confidence value corresponding to the pixel and setting the cleaning confidence value to one of either the color confidence value or the luminance confidence value based on the comparison.

6. The method of claim 5, wherein the glyph confidence value comprises at least one of a grayscale glyph confidence value or a color glyph confidence value and further comprising:

determining whether the pixel corresponds to a color glyph based on the corresponding color confidence value;

if the pixel corresponds to a color glyph, utilizing the color glyph confidence value; and if the pixel does not correspond to a color glyph, utilizing the grayscale glyph confidence value.

7. The method of claim 1, wherein removing the shadow represented by the one or more pixels in the digital image comprises generating a modified local luminance map for the plurality of pixels by:

comparing a luminosity of each pixel in the plurality of pixels to luminosities of a set of pixels surrounding the one or more pixels;

filtering the set of pixels to remove an outlier luminosity from the set of pixels based on a highest luminosity in the set of pixels; and replacing the luminosity of the one or more pixels with the luminosity of the highest remaining luminosity from the set of pixels, upon filtering the set of pixels.

8. The method of claim 1, wherein removing the shadow represented by the one or more pixels in the digital image comprises generating a modified local luminance map by:

comparing a luminosity of each pixel in the plurality of pixels to luminosities of a set of pixels surrounding the one or more pixels;

comparing a highest luminosity from the set of pixels to a luminosity floor threshold; and based on a determination that the luminosity from the set of pixels is below the luminosity floor threshold, replacing the luminosity of the one or more pixels with the luminosity floor threshold.

9. The method of claim 7, wherein removing the shadow represented by the one or more pixels in the digital image further comprises: modifying the luminosity of each of the one or more pixels based on the modified local luminance map and the cleaning confidence map.

10. The method of claim 9, wherein removing the shadow represented by the one or more pixels in the digital image further comprises: applying a blur filter to the cleaning confidence map prior to removing the shadow using the cleaning confidence map.

11. A system comprising:

at least one server; and at least one non-transitory computer readable storage medium storing instructions that, when executed by the at least one server cause the system to:

generate a cleaning confidence map having a plurality of confidence values corresponding to a plurality of pixels of a digital image based on luminosities and colors of the plurality of pixels by:

determining whether a first pixel portrays text or a graphic in the digital image;

comparing a color value of the first pixel and a luminance value of the first pixel to generate a color and illumination confidence value of the first pixel; and generating a first cleaning confidence value of the cleaning confidence map corresponding to the first pixel based on the determination of whether the first pixel portrays text or a graphic in the digital image and based on the color and illumination confidence value;

remove a shadow reflected by one or more pixels in the digital image by adjusting a luminosity of each pixel in the one or more pixels based on luminosities of pixels surrounding the one or more pixels and based on a likelihood that the one or more pixels is part of text or a graphic in the digital image, as indicated by the cleaning confidence map;

segregate the plurality of pixels into foreground pixels and background pixels based on a likelihood that each pixel in the plurality of pixels is part of text or a graphic, as indicated by the cleaning confidence map, such that pixels from the plurality of pixels corresponding to text or a graphic are classified as foreground pixels; and adjust a luminosity of the background pixels segregated based on the likelihood that each pixel in the plurality of pixels is part of text or a graphic.

12. The system of claim 11, wherein generating the cleaning confidence map further comprises:
generating a glyph mask for the digital image, wherein the glyph mask reflects whether each pixel in the plurality of pixels portrays text;
generating a color confidence map for the digital image by converting a color of each pixel of the plurality of pixels into a color confidence value, wherein the color confidence value reflects an extent that a color of a given pixel corresponds to a low-color; and
generating the cleaning confidence map based on the glyph mask and the color confidence map.

13. The system of claim 12, wherein the instructions, when executed by the at least one server, cause the system to remove the shadow reflected in the digital image by performing steps comprising: generating a shadow removal image by adjusting the luminosity of each pixel in the plurality of pixels based on luminosities of a set of pixels surrounding each pixel after application of a high-value filter to the luminosities of the set of pixels and based on the cleaning confidence map.

14. The system of claim 13, wherein the instructions, when executed by the at least one server, cause the system to segregate the plurality of pixels into foreground pixels and background pixels by performing steps comprising: segregating the plurality of pixels into foreground pixels and background pixels based on the cleaning confidence map and the glyph mask.

15. The system of claim 13, wherein segregating the plurality of pixels into foreground pixels and background pixels comprises generating a foreground mask comprising the foreground pixels by:
generating an intermediate mask by combining the cleaning confidence map and the glyph mask;
generating a blur mask from the shadow removal image by applying a blur filter to the shadow removal image; and
combining the blur mask and the intermediate mask to generate the foreground mask.

16. The system of claim 11, wherein the instructions, when executed by the at least one server, cause the system to adjust the luminosity of the background pixels by performing steps comprising: modifying the luminosity of the background pixels based on a distance of each of the background pixels from a white point in a color space such that a larger the distance from the white point in the color space to the first pixel, the greater the modification.

17. In a digital medium environment for editing digital images, a method of enhancing digital images by modifying illumination of pixels based on pixel content, comprising:
generating, by at least one processor, a cleaning confidence map comprising a plurality of cleaning confidence values corresponding to a plurality of pixels of a digital image, by:
generating a glyph mask, the glyph mask indicating whether each pixel of the plurality of pixels portrays text in the digital image;
comparing a color associated with each pixel from the plurality of pixels with a luminosity associated with each pixel to generate a color and illumination confidence value; and
generating a cleaning confidence value for each pixel from the plurality of pixels based on the glyph mask and the color and illumination color confidence value for each pixel;
modifying luminosities of pixels reflecting shadows in the digital image based on the cleaning confidence map;
identifying background pixels of the digital image based on the cleaning confidence map;
modifying luminosities of the background pixels; and
modifying a contrast of the digital image by adjusting luminosities of the plurality of pixels based on the cleaning confidence map.

18. The method of claim 17, wherein modifying the contrast of the digital image further comprises:
calculating a luminosity correction for each pixel in the plurality of pixels; and
modifying the luminosity correction for each pixel based on the cleaning confidence map, such that the luminosity correction for each pixel corresponds to the cleaning confidence value corresponding to the pixel.

19. The method of claim 17, further comprising:
separating the plurality of pixels of the digital image into foreground and background pixels based on the cleaning confidence map; and
adjusting luminosity of the background pixels, wherein the background pixels are reflected utilizing a color space, based on a distance between each pixel of the background pixels and a white point in the color space.

20. The method of claim 17, wherein separating the plurality of pixels of the digital image into foreground and background pixels comprises generating a foreground mask by:
generating an intermediate mask by combining the glyph mask and the cleaning confidence map;
generating a blur mask by applying a blur filter to the digital image; and
combining the intermediate mask and the blur mask to generate the foreground mask.

* * * * *